(12) United States Patent
McKee et al.

(10) Patent No.: US 8,455,797 B2
(45) Date of Patent: Jun. 4, 2013

(54) HIGH-SPEED COOKING OVEN WITH OPTIMIZED COOKING EFFICIENCY

(75) Inventors: Philip R. McKee, Frisco, TX (US); Earl R. Winkelmann, Garland, TX (US); Lee T. VanLanen, McKinney, TX (US)

(73) Assignee: Appliance Scientific, Inc., Dallas, TX (US)

( * ) Notice: Subject to any disclaimer, the term of this patent is extended or adjusted under 35 U.S.C. 154(b) by 264 days.

(21) Appl. No.: 12/424,260

(22) Filed: Apr. 15, 2009

(65) Prior Publication Data
US 2009/0236331 A1 Sep. 24, 2009

(51) Int. Cl.
*F27D 7/04* (2006.01)
*F24C 15/32* (2006.01)

(52) U.S. Cl.
USPC .......................... 219/400; 219/681; 126/21 A

(58) Field of Classification Search
USPC ................. 219/757, 678–685, 400, 480, 702, 219/720, 739–744, 756; 126/21 A, 21 R, 126/299 R, 299 D; 99/475; 426/241, 466
See application file for complete search history.

(56) References Cited

U.S. PATENT DOCUMENTS

| | | | |
|---|---|---|---|
| 2,617,966 A | 11/1952 | Kilgore | |
| 2,898,438 A | 8/1959 | Gibson | 219/37 |
| 3,397,817 A | 8/1968 | Smith | |
| 3,767,883 A | 10/1973 | Staats | |
| 3,884,213 A | 5/1975 | Smith | |
| 4,121,079 A | 10/1978 | Harmon | 219/10.055 B |
| 4,332,992 A | 6/1982 | Larsen et al. | 219/999.999 |
| 4,335,290 A | 6/1982 | Teich | |
| 4,421,968 A | 12/1983 | Osepchuk | 219/999.999 |
| 4,523,391 A | 6/1985 | Smith et al. | |
| 4,753,215 A * | 6/1988 | Kaminski et al. | 126/21 A |
| 4,876,426 A | 10/1989 | Smith | |
| 5,128,158 A | 7/1992 | Chartrain et al. | |
| 5,154,940 A | 10/1992 | Budzyna et al. | 426/232 |
| 5,166,487 A | 11/1992 | Hurley et al. | |
| 5,254,823 A | 10/1993 | McKee et al. | |
| 5,272,299 A | 12/1993 | Ovadia | |

(Continued)

FOREIGN PATENT DOCUMENTS

| | | |
|---|---|---|
| DE | 3703467 | 8/1988 |
| EP | 0592255 | 4/1994 |

(Continued)

OTHER PUBLICATIONS

International Search Report dated Jun. 27, 2008 for PCT/US2008/055518.

(Continued)

*Primary Examiner* — Quang Van
(74) *Attorney, Agent, or Firm* — Ohlandt, Greeley, Ruggiero & Perle, L.L.P.

(57) ABSTRACT

The present invention is directed to improving the conventional high-speed cooking oven based on a combination of hot air impingement and microwave heating by providing a time-dependent spatial variation in the net air impingement and/or net microwave energy applied to the food product in the oven. This is aimed at optimizing heat transfer and microwave efficiencies in a high-speed cooking oven, thereby enabling the oven to deliver an optimal cooking efficiency in comparison to the conventional high-speed cooking oven. In addition, under the embodiments of the present invention, the cooking efficiency may be further optimized by providing a plenum between each wall of the cooking chamber and the housing of the oven.

18 Claims, 28 Drawing Sheets

U.S. PATENT DOCUMENTS

| | | | |
|---|---|---|---|
| 5,345,923 A | 9/1994 | Luebke et al. | 126/21 A |
| 5,401,940 A | 3/1995 | Smith et al. | |
| 5,416,304 A | 5/1995 | De La Cruz | |
| 5,434,390 A | 7/1995 | McKee et al. | |
| 5,483,044 A | 1/1996 | Thorneywork et al. | |
| 5,556,566 A | 9/1996 | Cappello et al. | |
| 5,558,793 A | 9/1996 | McKee et al. | |
| 5,582,758 A | 12/1996 | Smith et al. | 219/681 |
| 5,600,310 A | 2/1997 | Whipple et al. | 340/825.06 |
| 5,616,269 A | 4/1997 | Fowler et al. | 219/720 |
| 5,676,870 A | 10/1997 | Wasserman et al. | |
| 5,683,240 A | 11/1997 | Smith | |
| 5,816,234 A | 10/1998 | Vasan | |
| 5,818,014 A | 10/1998 | Smith et al. | |
| 5,897,807 A | 4/1999 | Edgar et al. | |
| 5,927,265 A | 7/1999 | McKee et al. | |
| 5,928,541 A | 7/1999 | Tsukamoto et al. | |
| 5,958,274 A | 9/1999 | Dobie et al. | |
| 5,990,466 A | 11/1999 | McKee et al. | |
| 6,008,483 A | 12/1999 | McKee et al. | |
| 6,060,701 A | 5/2000 | McKee et al. | |
| 6,140,626 A | 10/2000 | McKee et al. | |
| 6,242,725 B1 | 6/2001 | Murata et al. | 219/757 |
| 6,262,406 B1 | 7/2001 | McKee et al. | |
| 6,281,484 B2 | 8/2001 | Thomas | |
| 6,307,190 B1 | 10/2001 | Thomas | |
| 6,359,271 B1 | 3/2002 | Gidner et al. | 219/732 |
| 6,376,817 B1 | 4/2002 | McFadden et al. | 219/681 |
| 6,392,211 B2 | 5/2002 | Kim et al. | |
| 6,403,937 B1 | 6/2002 | Day et al. | |
| 6,486,453 B1 | 11/2002 | Bales et al. | |
| 6,528,773 B2 | 3/2003 | Kim et al. | 219/681 |
| 6,568,215 B2 | 5/2003 | Schofield et al. | |
| 6,670,586 B2 | 12/2003 | Ingemanson et al. | 219/492 |
| 6,716,467 B2 | 4/2004 | Cole | |
| 6,768,087 B2 | 7/2004 | Kikuchi | |
| 6,805,112 B2 | 10/2004 | Cole et al. | |
| 6,874,495 B2 | 4/2005 | McFadden | |
| 6,911,636 B2 | 6/2005 | Shon | 219/757 |
| 6,927,371 B1 | 8/2005 | Hargett et al. | |
| 7,055,518 B2 | 6/2006 | McFadden et al. | |
| 7,087,872 B1 | 8/2006 | Dobie et al. | |
| 7,109,447 B2 | 9/2006 | Goranson | |
| 7,271,373 B2 | 9/2007 | Oh et al. | 219/681 |
| 7,360,533 B2 | 4/2008 | McFadden et al. | 126/21 |
| 7,435,931 B1 | 10/2008 | McKee et al. | |
| 7,886,658 B2 | 2/2011 | McFadden et al. | 99/324 |
| 8,026,463 B2 | 9/2011 | McKee et al. | 219/680 |
| 2004/0118392 A1 * | 6/2004 | McFadden | 126/21 A |
| 2005/0205566 A1 | 9/2005 | Kassayan | |
| 2005/0217503 A1 | 10/2005 | McFadden | |
| 2005/0236388 A1 | 10/2005 | Goranson | |
| 2006/0191918 A1 | 8/2006 | Ashford et al. | |
| 2007/0137633 A1 | 6/2007 | McFadden | |
| 2008/0283519 A1 | 11/2008 | McKee et al. | 219/680 |
| 2009/0218336 A1 | 9/2009 | McKee et al. | 219/680 |
| 2009/0236331 A1 | 9/2009 | McKee et al. | 219/681 |

FOREIGN PATENT DOCUMENTS

| | | | |
|---|---|---|---|
| EP | 0631459 | | 12/1994 |
| EP | 0696710 B1 | | 1/2002 |
| JP | 63201427 A | * | 8/1988 |
| JP | 03011233 A | * | 1/1991 |
| WO | 9641499 | | 12/1996 |
| WO | WO96/41499 | | 12/1996 |
| WO | 2008140854 | | 11/2008 |
| WO | 2008143942 | | 11/2008 |

OTHER PUBLICATIONS

Written Opinion of the International Searching Authority dated Jun. 27, 2008 for PCT/US2008/055518.
International Search Report dated Nov. 13, 20008 for PCT/US2008/006246.
Written Opinion of the International Searching Authority dated Nov. 13, 2008 for PCT/US2008/006246.
International Search Report issued Jun. 18, 2010 in the corresponding PCT/US2010/031299.
Int'l Preliminary Report on Patentability mailed Jun. 24, 2011 in related PCT/US2010/031299.
Int'l Search Report mailed Aug. 12, 2011 in related PCT/US2011/035624.
Int'l Search Report mailed Oct. 20, 2011 in related PCT/US2011/035242.
European Search Report communicated Sep. 6, 2011 in related EP09747482.9.
European Search Report communicated Sep. 6, 2011 in related EP08767718.3.
European Search Report communicated Aug. 30, 2011 in related EP09747463.9.
European Search Report communicated Sep. 2, 2011 in related EP09747472.0.
European Search Report and Opinion Issued Feb. 6, 2012 in the Related EP 08731142.9.
Canadian Office Action dated Jul. 20, 2012 corresponding to Canadian Patent Application No. 2687297.
European Office Action dated Jul. 20, 2012 corresponding to European Patent Application No. 09747482.9.
European Office Action dated Jul. 19, 2012 corresponding to European Patent Application No. 09747472.0.
Canadian Patent Office Action dated Oct. 9, 2012 for Canadian Patent Application No. 2,734,144, pp. 2.
Canadian Patent Office Action dated Oct. 4, 2012 for Canadian Patent Application No. 2,734,149, pp. 2.

* cited by examiner

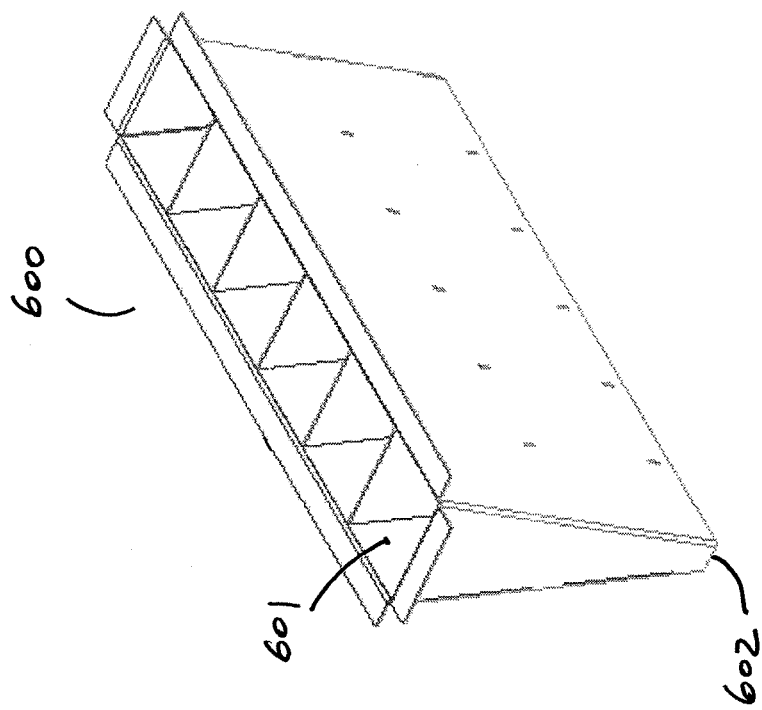
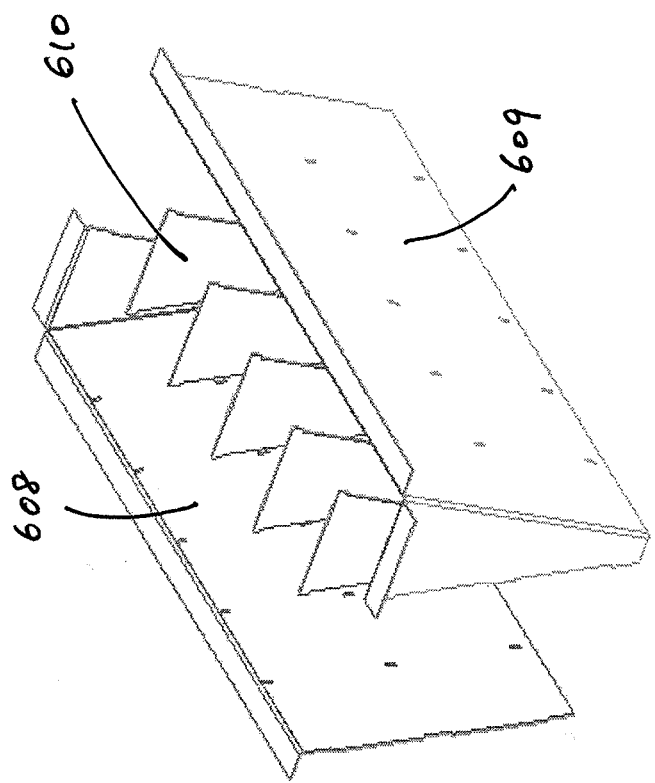
FIG. 6A
FIG. 6B

HIGH-SPEED COOKING OVEN WITH OPTIMIZED COOKING EFFICIENCY

CROSS-REFERENCE TO RELATED APPLICATION

This patent application is a continuation-in-part of co-pending U.S. patent application Ser. No. 12/120,497, filed on May 14, 2008, which is a continuation-in-part of U.S. patent application Ser. No. 11/803,787, filed on May 15, 2007, now U.S. Pat. No. 7,435,931. The contents of these applications are incorporated herein by reference in their entirety.

FIELD OF INVENTION

The present invention generally relates to an oven for cooking a food product. More particularly, the present invention relates to a high-speed cooking oven with optimal cooking efficiency.

BACKGROUND OF THE INVENTION

Hot air impingement and microwave radiation are two different means for heating and cooking a food product based on different physical principles. Hot air impingement is based on the transfer of heat from a hot air having a higher temperature to an object having a lower temperature, changing the internal energy of the air and the object in accordance with the first law of thermodynamics. On the other hand, microwave radiation consists of electromagnetic waves having a typical wavelength of 12.24 cm or 4.82 inches and a frequency of 2,450 MHz, which are capable of causing dielectric heating of water, fat and sugar molecules in a food product.

Initially, ovens based on hot air impingement and microwave ovens were separately developed and commercialized. However, it was later demonstrated that a combination of hot air impingement and microwave radiation used in an oven can facilitate high-speed, high-quality cooking. See, for example, U.S. Pat. No. 5,254,823 to McKee et al., U.S. Pat. No. 5,434,390 to McKee et al., U.S. Pat. No. 5,558,793 to McKee et al., and U.S. Pat. No. 6,060,701 to McKee et al. This led to the development and commercialization of quick-cooking hybrid ovens based on both hot air impingement and microwave radiation and has established a new standard in the high-speed cooking technology.

While the technology of combining hot air impingement and microwave heating to achieve high-speed cooking in an oven has by now been well established, the current technology does not address a host of new challenges created by such combination, including the problem of inefficient energy use and consequent suboptimal cooking efficiency in the existing high-speed cooking ovens. The fundamental principle of cooking ovens is conversion of an available power (e.g., electric power) into heat energy to be directed to and absorbed by a food product in the oven to raise its internal temperature. Accordingly, the optimal cooking efficiency of an oven requires that the amount of heat energy converted from a given power be maximized; the amount of the heat energy directed to a food product in the oven be maximized; and the amount of the heat energy absorbed and retained by the food product be maximized. However, the current technology of the high-speed cooking ovens using both hot air impingement and microwave radiation is not directed to achieving such optimal cooking efficiency.

As a food product resides in a hot air environment of an oven, temperature gradients, or several boundary layers, form around the cooler food product. The oven cooks the food product by transferring the heat energy to the food product through these temperature gradients. Forced air convection by, for example, a fan can improve the heat transfer by "wiping away" the temperature gradients around the food product and bringing the higher temperature air closer to the food product. Hot air impingement can further improve the heat transfer by "piercing" the temperature gradients with jets of hot air and bringing the air at higher temperature closer to the surface of the food product. However, significant portions of the electric power and the heat energy from the hot air impingement are lost in the process to the oven walls, various openings, plenum and air blower that form the hot air circulation and delivery system of the oven. In addition, the presence of a microwave launcher in the cooking chamber may further reduce the efficiency of heat transfer by the hot air impingement.

Another well-known problem with the technique of hot air impingement is "spotting" in the areas directly impacted by the hot air jets, causing uneven heating or scorching of the surface of the food product. While this problem may be resolved by, for example, reduction in the hot air velocity and/or increase in the diameter of the columns of impinging hot air, such solutions may further reduce the efficiency of the hot air impingement.

In addition, the diameter/cross-sectional area of a column of hot air impingement generally increases as the distance from the hot air jet orifice increases, thereby reducing the efficiency of hot air impingement. While this problem may be solved by increasing the hot air velocity, as discussed above, such solution may further aggravate the spotting problem.

As for the microwave portion of the conventional high-speed cooking oven, a portion of the electric power is lost to heat within the transformer and magnetron during the process of generating microwaves. In addition, some portion of microwave energy is lost when reflected from the cavity walls back to the magnetron and dissipated through the cooling fan. This can occur when there is an uneven matching between the microwave delivery system and the microwave load.

Furthermore, it is also well known that microwave provides uneven heat energy distribution across the volume of a cooking cavity. While the horizontal unevenness may be eliminated by rotating the food product around a vertical axis in the oven, as many conventional microwave ovens do, such solution does little to reduce the vertical unevenness in the heat energy distribution.

There is yet another source of inefficiency in the conventional high-speed cooking oven. Until the temperature at any portion of a food product in the oven reaches 212° F. at which the water molecules in the food product start being converted into steam during the cooking process, the amount of the energy absorbed by the food product roughly equals the amount of the energy directed at the food product. However, after the point when the water starts to be converted into steam, a portion of the energy directed at the food product is not absorbed by the food product, but is lost as the energy of activating the water into steam, which subsequently escapes from the food product carrying away a portion of thermal energy from the food product. This phenomenon is further complicated by the fact that the heat energy absorbed at the surface of the food product is not immediately dispersed downward below the surface due to the finite heat transfer coefficient (or thermal conductivity) of the food product and it takes some time to bring the inner mass of the food product into thermal equilibrium with the surface. Accordingly, the efficiency in heat transfer to the food product in the oven decreases after the temperature of the food surface reaches 212° F., when the resulting steam at a higher temperature than the inner temperature of the food product carries away heat energy from the food product.

Yet another potential source of inefficiency exists in conventional high-speed cooking ovens. In prior art ovens, at least one side wall, and typically both side walls, of the cooking chamber is exposed to either the outside surface of the oven (with perhaps insulation or microwave waveguides disposed between the wall of the cooking chamber and the outside surface of the oven) or to the controls of the oven.

In summary, the problem with the current high-speed cooking technology based on a combination of hot air impingement and microwave radiation is that the combination has never been done in a way to optimize the cooking efficiency of the oven. With the suboptimal cooking efficiency in the presence of various sources of inefficiencies in the conversion of electrical power to heat, the currently available high-speed cooking ovens (either commercial models or residential models) operate on a power supply based on 220 volts or greater. As a result, this relatively high electric power required to operate the high-speed cooking oven limits the universe of possible applications and customer bases, especially in residential households where a 120 volt-based power supply is more common.

Thus, it is an object of the present invention to eliminate or reduce some of the inefficiencies in heat transfer present in the conventional high-speed cooking ovens.

It is yet another object of the present invention to optimize the cooking efficiency of a high-speed cooking oven.

It is yet another object of the present invention to optimize the combination of hot air impingement and microwave to seek the greater cooking efficiency than was possible in the conventional high-speed cooking oven.

It is yet another object of the present invention to optimize the cooking efficiency of the hot air impingement.

It is yet another object of the present invention to optimize the cooking efficiency of the microwave heating.

It is yet another object of the present invention to resolve the spotting problem without compromising the cooking efficiency of the hot air impingement.

It is yet another object of the present invention to provide a more even distribution of microwave heating compared to the conventional high-speed cooking oven.

It is yet another object of the present invention to match the cavity of a high-speed cooking oven to the microwave load.

It is yet another object of the present invention to optimize the efficiency of heat transfer to a food product in the oven by overcoming the inefficiency created by the heat loss due to the water steam escaping from the food product at 212° F. and the time lag in the heat energy distribution in the inner mass of the food product due to its finite heat transfer coefficient.

It is yet another object of the present invention to provide a high-speed cooking oven that can operate on a power supply based on voltage less than 220 volts.

It is yet another object of the present invention to provide a high-speed cooking oven that can operate on a power supply based on a voltage between 110 and 125 volts.

It is yet another object of the present invention to provide a high-speed cooking oven capable of operating on a power supply based on the voltage of 120 volts and the current of 30 amperes.

It is yet another object of the present invention to reduce the operating costs of high-speed cooking ovens.

Other objects and advantages of the present invention will become apparent from the following description.

SUMMARY OF THE INVENTION

It has now been found that the above-mentioned and related objects of the present invention are obtained in the form of several separate, but related, aspects including an oven for cooking a food product at least partially by hot air impingement and/or at least partially by microwave.

More particularly, an oven according to an exemplary embodiment of the present invention comprises a cooking chamber defined by a top, a bottom, a rear wall, and a pair of side walls; one or more blowers that provide a gas to the cooking chamber; and a plurality of plenums substantially surrounding the cooking chamber such that the gas contacts at least a portion of each of the top, the bottom, the rear wall, and the side walls as it flows outside the cooking chamber from the one or more blowers through the plenums before returning to the one or more blowers.

In at least one embodiment, the plurality of plenums includes at least one plenum through which gas is provided to the cooking chamber.

In at least one embodiment, the plurality of plenums includes at least one plenum through which gas from the cooking chamber returns to the one or more blowers.

In at least one embodiment, the at least one plenum is disposed atop the cooking chamber.

In at least one embodiment, the at least one plenum is disposed beneath the cooking chamber.

In at least one embodiment, the at least one plenum is disposed adjacent one of the side walls of the cooking chamber.

In at least one embodiment, the side walls are located across the cooking chamber from one another; a first plenum is disposed adjacent one of the pair of side walls; and a second plenum is disposed adjacent the other one of the pair of side walls.

In at least one embodiment, each one of the side walls of the pair of side walls includes a return air opening located through which gas flows from the cooking chamber to the first plenum or the second plenum.

In at least one embodiment, the return air opening is located near the bottom of the cooking chamber.

In at least one embodiment, the at least one plenum is disposed behind the cooking chamber.

An oven according to another exemplary embodiment of the present invention comprises a cooking chamber including a first side wall and a second side wall located across the cooking chamber from the first side wall; a first plenum disposed adjacent the first side wall and in gaseous communication with the cooking chamber; and a second plenum disposed adjacent the second side wall and in gaseous communication with the cooking chamber.

In at least one embodiment, the first side wall includes an opening that enables the gaseous communication.

In at least one embodiment, the second side wall includes an opening that enables the gaseous communication.

In at least one embodiment, the cooking chamber further includes a bottom, and the openings are located near the bottom of the cooking chamber.

In at least one embodiment, the oven further comprises a third plenum disposed behind the cooking chamber and in gaseous communication with the first and the second plenums.

In at least one embodiment, the oven further comprises a fourth plenum disposed atop the cooking chamber and in gaseous communication with the cooking chamber.

In at least one embodiment, the oven further comprises a fifth plenum disposed beneath the cooking chamber and in gaseous communication with the cooking chamber.

An oven according to another exemplary embodiment of the present invention comprises a cooking chamber including a first side wall and a second side wall located across the cooking chamber from the first side wall; a rear plenum disposed behind the cooking chamber; at least one top plenum disposed atop the cooking chamber and in gaseous communication with the cooking chamber; a bottom plenum disposed beneath the cooking chamber and in gaseous communication with the cooking chamber; a first side plenum disposed adjacent the first side wall and in gaseous communication with the cooking chamber and the rear plenum; and a second side plenum disposed adjacent the second side wall and in gaseous communication with the cooking chamber and the rear plenum.

In at least one embodiment, the top plenum comprises a plenum for supplying a gas to the cooking chamber.

In at least one embodiment, the bottom plenum comprises a plenum for supplying a gas to the cooking chamber.

In at least one embodiment, the first side plenum comprises a plenum for returning a gas to the rear plenum.

In at least one embodiment, the second side plenum comprises a plenum for returning a gas to the rear plenum.

In at least one embodiment, the oven further comprises one or more blowers, wherein the gas flowing through the rear plenum is returned to the one or more blowers.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIGS. 6A, 6B, 6C, and 6D illustrate a tube used for hot air impingement in yet another alternative embodiment of the present invention.

DETAILED DESCRIPTION OF PREFERRED EMBODIMENTS

While the present invention will be described in terms of a stand-alone or counter-top high-speed cooking oven, it will be apparent to those skilled in the art that an oven according to the present invention may alternatively be implemented as a wall unit, a console model having feet adapted to rest on the floor, part of a vending machine, or other variations thereof.

Figure 1:
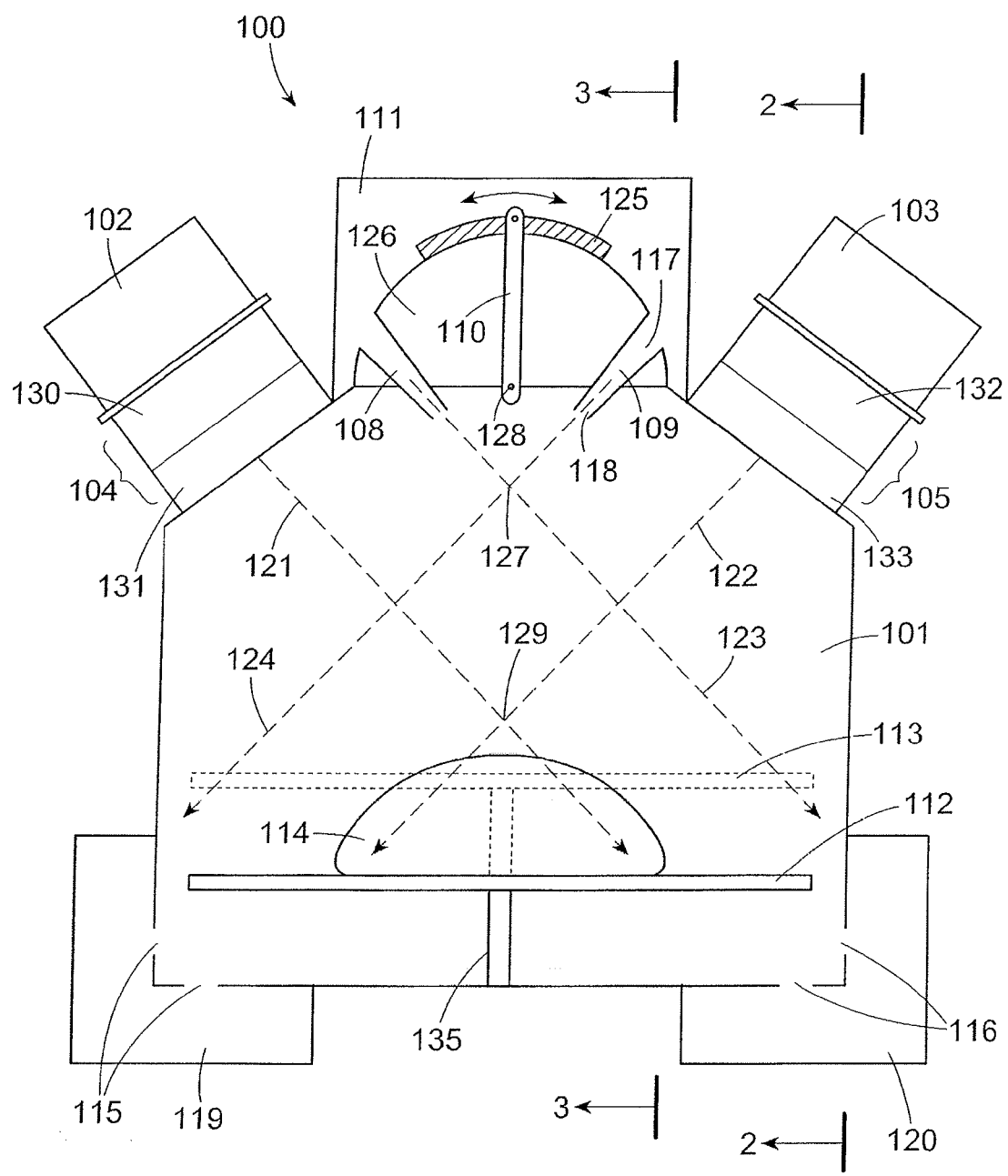
FIG. 1 illustrates a sectional view of an exemplary embodiment of the present invention.
Figure 2:
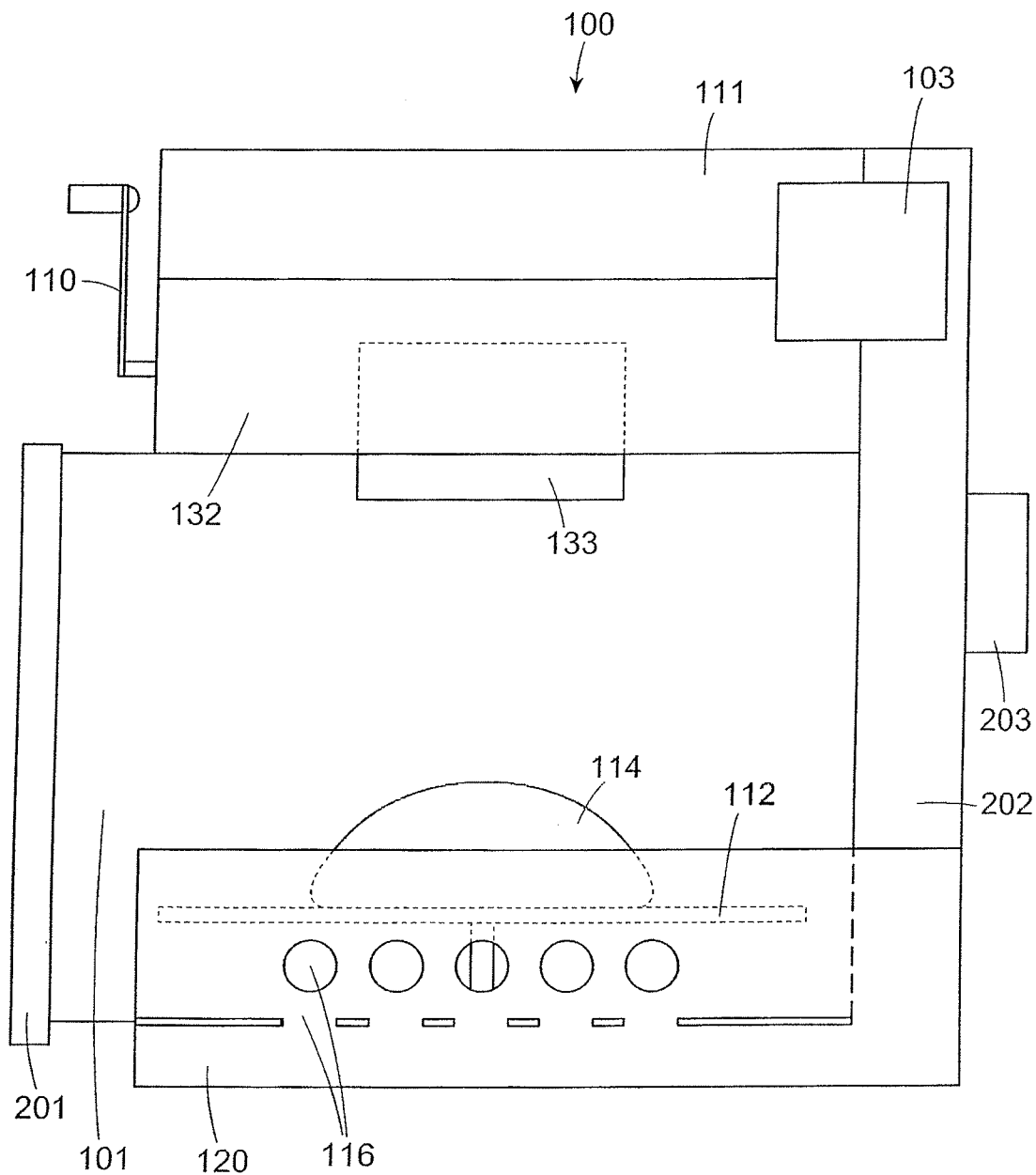
FIG. 2 illustrates another sectional view thereof taken along the line 2-2 of FIG. 1.
Figure 3:
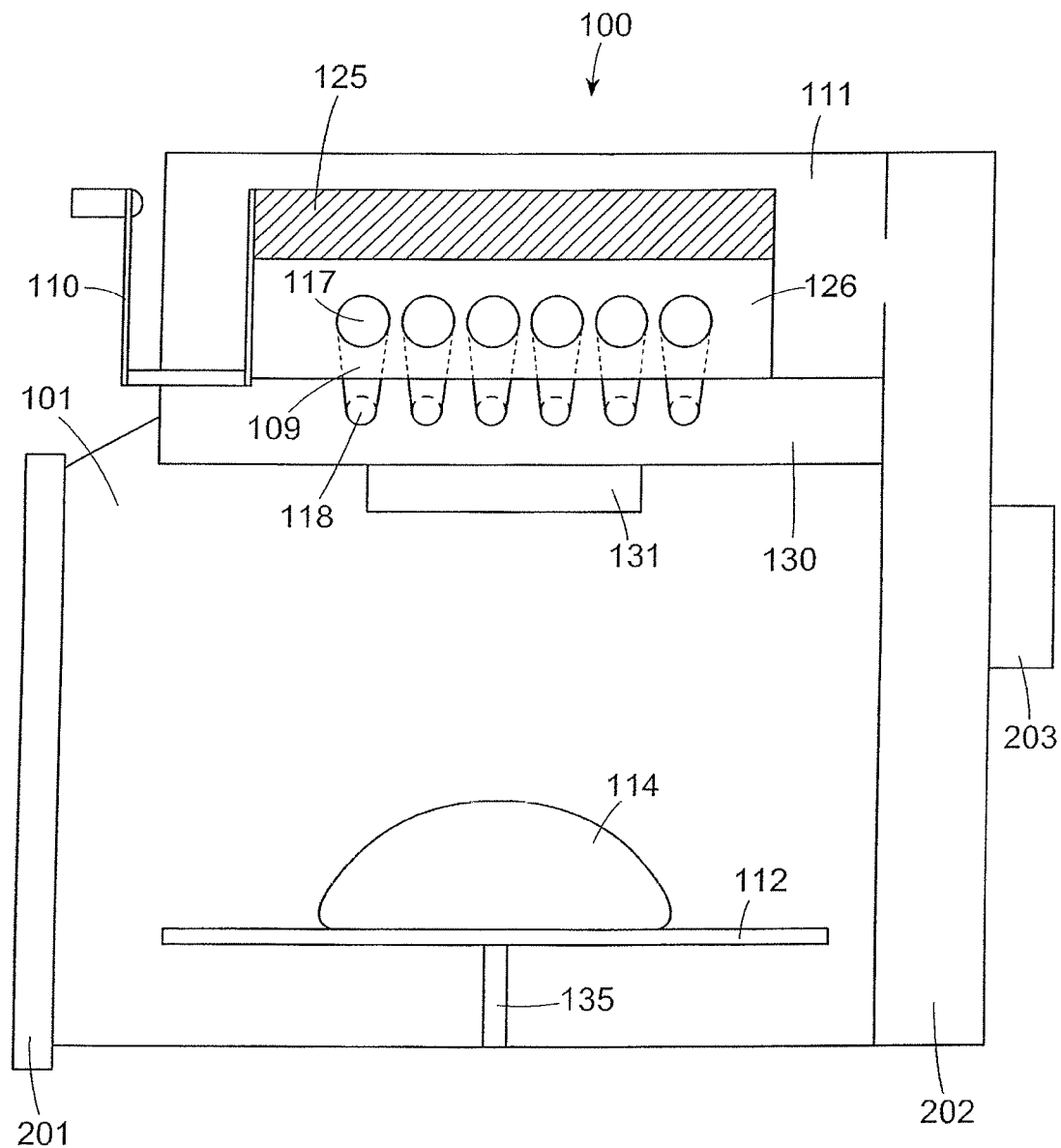
FIG. 3 illustrates yet another sectional view thereof taken along the line 3-3 of FIG. 1.

Referring now to the drawings, in particular to FIGS. 1-3 thereof, therein illustrated is a hybrid oven based on a combination of hot air impingement and microwave according to an exemplary embodiment of the present invention, generally designated by the reference numeral 100. It is first noted that these figures are merely schematic illustrations of an exemplary embodiment of the present invention based on various sectional views and are not intended to reflect the exact dimensions, scales or relative proportions of the oven 100 or components thereof, or the full engineering specification thereof, which should be apparent to those skilled in the art. FIG. 1 is a frontal sectional view of the oven, while FIG. 2 is a side sectional view of the oven taken along the line 2-2 of FIG. 1 and FIG. 3 is another side sectional view of the oven taken along the line 3-3 of FIG. 1. The oven 100 comprises a cooking chamber generally designated 101, which is adapted to receive a food product 114 to be placed on a support 112 for cooking. FIGS. 2 and 3 illustrate a door 201 through which the food product 114 can be received by the cooking chamber 101.

The support 112 may comprise a horizontally planar top surface to support the food product 114 and its corresponding bottom surface. The support may further comprise one or more holes or openings therein to facilitate gaseous communication between above the top surface and below the bottom surface of the support 112. The support 112 may be of any feasible shape, common shapes including rectangular and circular shapes. Referring to FIG. 1, when the "right side" and the "left side" of the support 112 are referred to in the following description, they are intended to refer to the two opposite sides of the support 112 as viewed in FIG. 1, wherein the "right" and the "left" are defined by the right and the left side walls of the cooking chamber 101. In alternative embodiments, the support 112 for receiving and holding a food product in the cooking chamber 101 may be in a non-planar form, such as horizontally or vertically positioned skewer. In these cases, the "right" and the "left" sides of the support correspond to the opposite ends of the skewer. It should be appreciated that the "left" and the "right" sides of the support as referred to in the description depend on the physical configuration of the support and the cooking chamber.

In at least one alternative embodiment of the present invention, the support 112 may be in the form of an elevator or may be coupled to an elevating mechanism so that the height of the support 112 with respect to the top and bottom of the cooking chamber may be dynamically adjusted during the cooking. As discussed further below, the dynamical adjustment of the height of the support 112 during the operation of the cooking oven may be used to optimize the cooking efficiency and power consumption of the cooking oven.

The cooking chamber 101, return air plenums 119, 120, an air conduit 202 and an air inlet housing 111 form an air circulation and delivery system of the oven 100. The terms "air" and "airflow" are used interchangeably with "gas" and "gas flow" in this description unless otherwise noted. As shown in FIG. 1, the return air plenums 119, 120 may be positioned adjacent to the bottom portion of the cooking chamber 101 and are adapted for gaseous communication with the cooking chamber 101 through return air exit holes 115, 116. FIG. 1 shows that these return air exit holes 115, 116 are positioned below and in the proximity of the left and the right sides of the support 112, respectively. They are adapted to receive the air flow from within the cooking chamber 101 to be guided to the air conduit 202. While not shown in the figure, the return air exit holes 115, 116 may comprise gates which can be opened or closed based on an external control.

The return air plenums 119, 120 are connected to an air conduit 202 (shown in FIG. 2), which may be vertically disposed on the back side of the oven 100 opposite from the oven door 201. The air conduit 202 allows gaseous communication between the return air plenums 119, 120 and the air inlet housing 111 positioned on the top of the cooking chamber 101. For the sake of simplicity, the interconnected air circulation and delivery system of the air conduit 202, the return air plenums 119, 120, and the air inlet housing 111 will be referred to as a conduit. While not shown in the figures, a thermal energy source, such as parallel heating coils, may be coupled to or disposed in the air conduit 202 to heat the air disposed therein. In an alternative embodiment, instead of a single joint air conduit 202, each of the return air plenums 119, 120 may have its own air conduit for gaseous communication with the air inlet housing 111. FIGS. 2 and 3 show a hot air blower 203 which circulates the air in the air circulation and delivery system defined by the cooking chamber 101, the return air plenums 119, 120, the return air conduit 202 and the air inlet housing 111, and provides the desired hot airflow onto the food product 114 placed on the support 112 in the cooking chamber 101.

The air inlet housing 111 positioned on the top of the cooking chamber 101 provides the hot air flow in the form of air impingement into the cooking chamber 101 through at least two nozzles (or impingement tubes) 108 and 109. The two sets of nozzles 108 and 109 are respectively positioned on the opposite sides of a semi-cylindrical base 126 (shown as a semi-circle in the sectional view in FIG. 1) on the top of the cooking chamber 101 in the air inlet housing 111. FIG. 3 shows a row of six nozzles 109 on one side of the base 126. While not shown in any figure, there is another row of six nozzles 108 on the other side of the base 126, with each of the nozzles 108 positioned on one side of the base 126 directly opposite to the corresponding one of the nozzles 109 on the other side of the base 126. Each nozzle 108, 109 has a tubular structure of a given height, and is subtended at one end by a circular inlet orifice 117 positioned within the air inlet housing 111 and at the opposite end by a circular exit orifice 118 protruding in the cooking chamber 101. The nozzle exit orifices direct columnated flows of hot air (air impingement) into the cooking chamber 101. The nozzles are preferably made of a suitably strong and sturdy material (e.g., steel) that can withstand the temperature and pressure of the hot air flowing or being blown through the nozzles.

In at least one alternative embodiment of the present invention, in addition to the nozzles 108 and 109 shown in FIG. 1, or other means of hot air impingement protruding substantially from the top of the cooking chamber 101, one or more air inlets or another set of nozzles may be placed below the support 112 substantially at the bottom of the cooking chamber 101 to direct a hot air flow or hot air impingement to the underside of the support 112. In this exemplary embodiment, the conduit may further comprise a bottom air plenum from which the heated air may be directed to the underside of the support 112 via the one or more air inlets or bottom nozzles. The bottom air plenum is connected to the air conduit 202 and/or the air inlet housing 111 to divert a portion of the heated air to the bottom of the cooking chamber.

The amount of the heated air diverted from the air conduit 202/air inlet housing 111 to the bottom air plenum may be controlled or modulated by using a damper valve or a bottom air diverter. Alternatively, or in addition, the air inlet housing 111 may further comprise a deflector, which can affect the amount of heated air diverted to the bottom air plenum relative to the amount of the hot air flow from the top of the cooking chamber. By controlling the diversion of the heated air into the bottom air plenum, one can also control the amount of the heated air introduced from the top of the cooking chamber 101 through, for example, the top nozzles 108 and 109, thereby modulating its flow rate and velocity. In this way, even if the hot air blower 203 is driven by a single speed motor, one can achieve the substantially similar kind of hot air flow modulations that can be achieved by a significantly more expensive variable speed blower.

In at least one alternative embodiment of the present invention, instead of just one hot air blower 203 for the entire conduit, there may be two independently controllable hot air blowers, one for directing the heated gas in the conduit to the air inlet housing 111 on the top of the cooking chamber 101, and the other for directing the heated gas to the bottom air plenum.

It is also noted that by dynamically adjusting the height of the support 112 and thereby changing the distance of the food product 114 to the top nozzles 108 and 109 relative to the bottom air inlets or nozzles, one may achieve the effect substantially similar to the one achieved by modulating the amount of hot air flowing through the top nozzles 108 and 109 relative to the one flowing through the bottom air inlets or nozzles, with the support 112 being kept at a constant height.

In yet another alternative embodiment of the present invention (e.g., wherein the support for the food product in the cooking chamber is a horizontally positioned skewer), in addition to or as an alternative to the nozzles 108 and 109 protruding from the top of the cooking chamber 101, two corresponding sets of nozzles may be positioned to protrude from the bottom of the cooking chamber 101 to project the air impingements upwards towards the food product supported by the horizontal skewer. In yet another alternative embodiment of the present invention (e.g., wherein the support for the food product in the cooking chamber is a vertically positioned skewer), instead of the nozzles 108 and 109 protruding from the top of the cooking chamber, two sets of nozzles may be positioned to protrude respectively from, for example, the upper portion and the lower portion of a side wall of the cooking chamber. It should be appreciated that, depending on the physical configuration of the cooking chamber and the support for a food product therein, two sets of nozzles for the air impingement may be positioned in various possible places in the cooking chamber to accomplish the substantially similar "sweeping" effects that are to be described below.

Referring back to FIG. 1, two sets of nozzles (i.e., the left nozzles 108 and the right nozzles 109) on the opposite sides of the base 126 are adapted to direct the air impingements in respective directions 123 and 124 as indicated by the dotted lines coming out of the corresponding exit orifices. These directions 123 and 124 are at an angle with respect to the vertical axis of the cooking chamber 101 (or the horizontal plane of the support 112) and cross at a point 127 above the support 112, preferably vertically above the midpoint between the left and the right sides of the support 112 and preferably above the upper surface of any food product 114 placed on the support 112. In this configuration, the respective air impingements coming out of the left and the right nozzles 108 and 109 at the same time at the given angle would collide at the crossing point 127 at a distance from the support 112. If the energies of the air impingements from both nozzles 108 and 109 are equal (i.e., if the flow rates of both nozzles 108 and 109 are same), the net result of such collision would be a net air impingement directed substantially vertically downward from the crossing point 127 toward the point on the support directly below the crossing point 127, preferably the midpoint between the left and the right sides of the support 112. In an alternative embodiment wherein two sets of nozzles are positioned to protrude from the bottom of the cooking chamber and configured to project the air impingements upwards, the crossing point of the respective air impingements may be located below the support for the food product in the cooking chamber. In yet another alternative embodiment wherein the support is vertically positioned (e.g., a vertical skewer) and two sets of nozzles are positioned to protrude from a side wall of the cooking chamber, the crossing point of the respective air impingements may be located at a horizontal distance from the vertical midpoint of the support.

As indicated by the direction 123, the nozzle 108 on the left side of the base 126 directs the air impingement toward the right half of the cooking chamber 101, preferably toward a general area in the proximity of the right side of the support 112. In mirror symmetry, the nozzle 109 on the right side of the base 126 directs the air impingement toward the left half of the cooking chamber 101, as indicated by the direction 124, preferably toward a general area in the proximity of the left side of the support 112. Accordingly, the left and the right nozzles 108 and 109 are configured to generally direct the respective air impingements to the opposite portions of the food product 114 placed on the support 112. It should be appreciated that the "left side" and the "right side" of the support 112 to which the respective air impingements from the nozzles 109 and 108 are generally directed may correspond to any opposite portions of a food product placed on or held by the support. There may be various possible choices for the "left side" and the "right side" of the support depending on the physical configuration of the support and the cooking chamber.

The angle formed by the directions 123 and 124 with respect to the vertical axis of the cooking chamber 101 is determined by where the respective air impingements from the nozzles 108 and 109 are targeting. As an example, FIG. 1 shows that the directions 123 and 124 form an angle of roughly 45 degrees with respect to the vertical axis of the cooking chamber 101 and meet at the crossing point 127 at an angle of roughly 90 degrees. However, these angles may vary depending on the dimensions of the cooking chamber 101 and the support 112, as well as the relative positions of the nozzles 108 and 109.

Figure 4A:
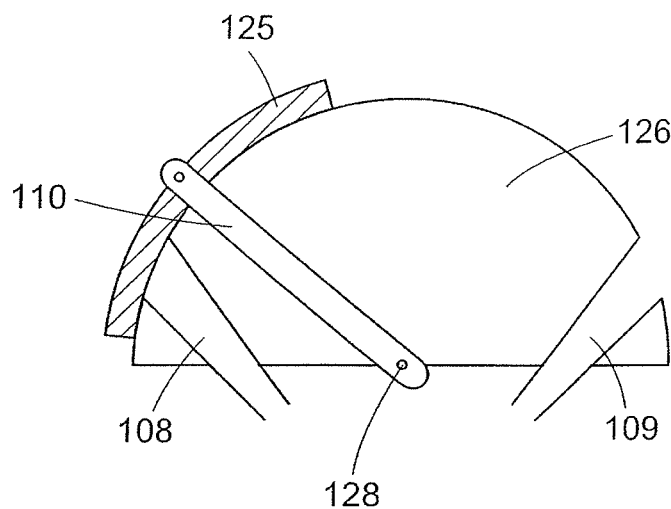
FIGS. 4A, 4B and 4C respectively illustrate various positions of an air modulating cover for controlling the flow rate of the nozzles for air impingement.
Figure 4B:
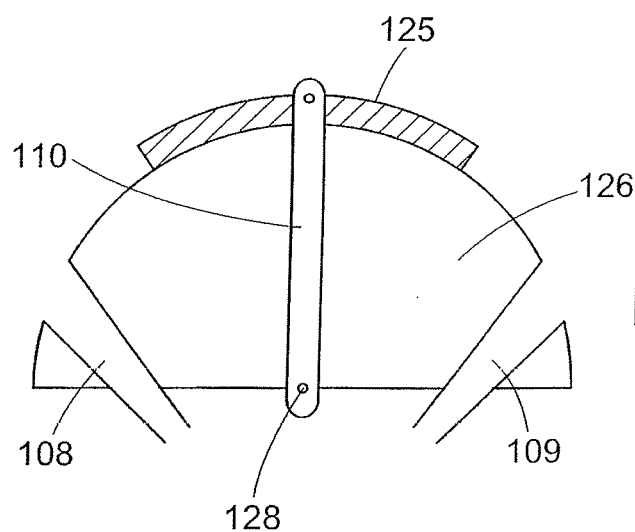
Figure 4C:
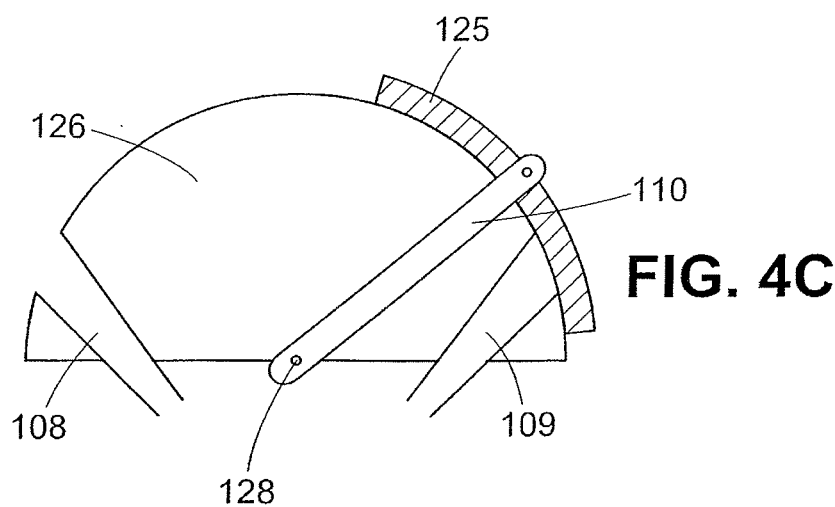

A flow rate of a nozzle may be determined by the dimension of the nozzle and the pressure of hot air into the nozzle. By controlling the input area of the nozzle for the hot air to flow through and thereby effectively changing the dimension of the nozzle, one may modulate the flow rate of the nozzle and consequently its corresponding air impingement applied to the food product 114 in the cooking chamber 101. This air modulation can be achieved by various means, including both manual and automatic control means. As an example, FIG. 1 shows that the oven 100 has an air modulator in the form of a cover 125 impermeable to the air that is configured for and capable of rotationally sliding over the outer surface of the semi-cylindrical base 126 containing two rows of the nozzle inlet orifices 117. This air modulating cover 125 is dimensioned to completely cover, at one time, a portion of the surface of the semi-cylindrical base 126 containing one row of the nozzle inlet orifices 117 so that no hot air may flow into the corresponding nozzles, while allowing the hot air in the air inlet housing 111 to flow into the nozzles positioned on the opposite side of the base 126. This situation is illustrated in FIGS. 4A and 4C. In FIG. 4A, the air modulating cover 125 is positioned to cover the row of the nozzle inlet orifices on the left side of the base 126 so that the air impingement is generated only through the nozzles 109 on the right side of the base 126. In FIG. 4C, the air modulating cover 125 is now positioned to cover the row of the nozzle inlet orifices on the right side of the base 126 so that the air impingement is generated only through the nozzles 108 on the left side of the base 126. When positioned properly, the air modulating cover 125 may be dimensioned to allow the equal amount of hot air in the air inlet housing 111 to flow into each nozzle in the both rows of nozzles 108 and 109 on the opposite sides of the base 126. This is illustrated in FIG. 4B.

As shown in FIG. 1, the position of the air modulating cover 125 on the outer surface of the base 126 may be controlled manually by a handle 110, which is coupled to the air modulating cover 125 through a hinge point 128. In this configuration, a manual torque may be exerted on the handle 110 to rotate the position of the air modulating cover 125 around the hinge point 128.

In an alternative embodiment, the position of the air modulating cover 125 may be controlled automatically by, for example, a suitable electromechanical control device known to those skilled in the art. Such automatic control means may facilitate a periodic change in the position of the cover 125 to create periodic modulations (e.g., sinusoidal modulations, periodic step function modulations, etc.) in time of the respective flow rates for the nozzles 108 on the left side of the base 126 and the nozzles 109 on the right side of the base 126. This periodic change in the position of the air modulating cover 125 to cover the nozzles 108 on the left side of the base 126 and the nozzles 109 on the right side of the base 126 alternatively in time may provide respective periodic modulations in the flow rate of the left and the right set of nozzles 108 and 109 that have the same amplitude and period, but differ in phase by 180 degrees. When the total amount of the hot air disposed in the air inlet housing 111 is maintained to be constant, the sum of the periodically modulated flow rates for the both sets of nozzles 108 and 109 also remains constant in time.

Figure 5A:
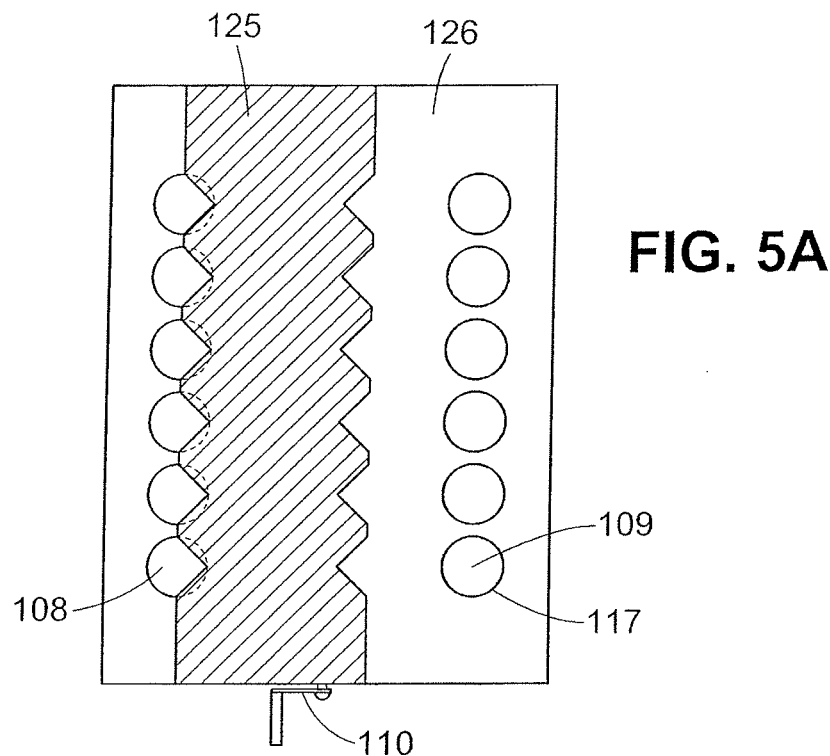
FIGS. 5A, 5B and 5C respectively illustrate various positions of an air modulating cover in an alternative embodiment viewed from the top.
Figure 5B:
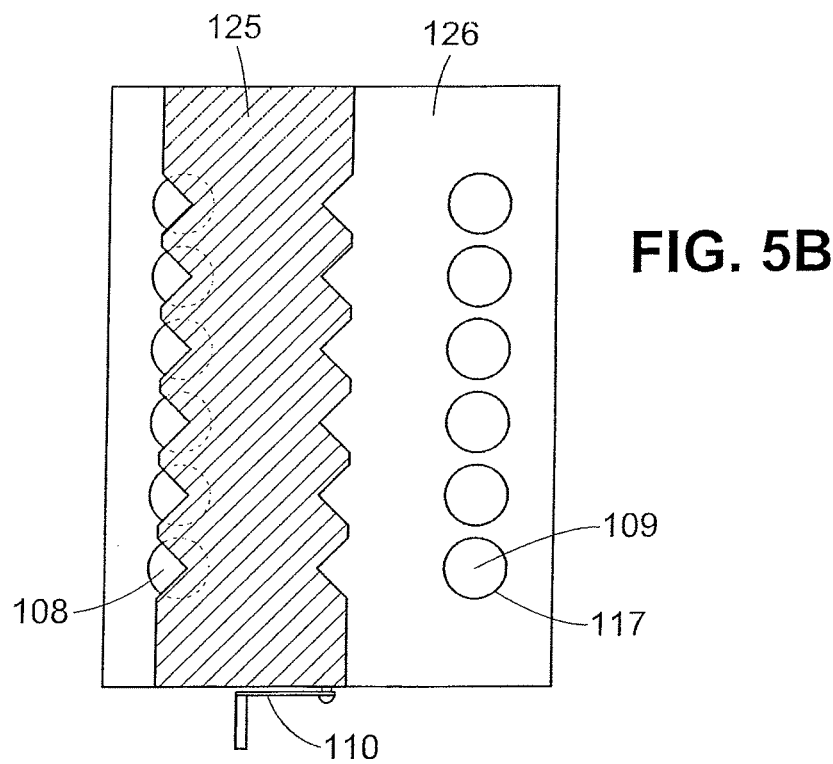
Figure 5C:
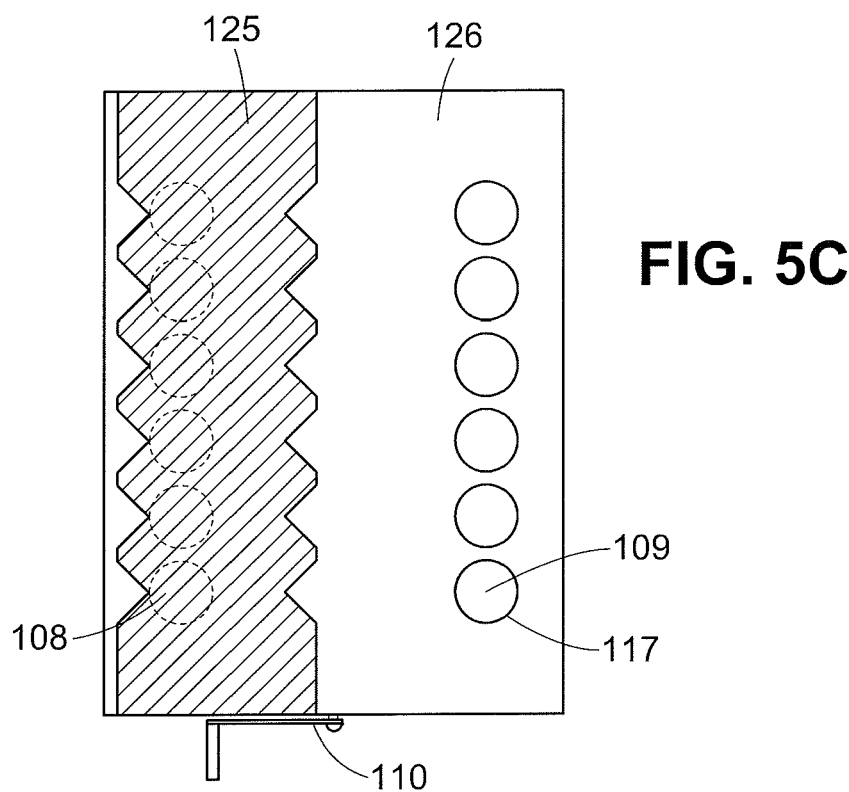

In another alternative embodiment, the side edges of the air modulating cover 125, which respectively slide over the inlet orifices of the left and the right nozzles 108 and 109 during the modulation of the respective flow rates, may be specially shaped or indented to facilitate a more gradual modulation in the flow rates in time and a gradual transition between the opening and the closing of the nozzles. FIGS. 5A-5C illustrate various positions of one exemplary air modulating cover 125, viewed from the top, comprising side edges having triangular indents at the positions corresponding to the nozzle inlet orifices on the surface of the base 126. FIG. 5A shows the left side edge of the air modulating cover 125 just starting to partially cover the inlet orifices of the left nozzles 108. If the side edges were straight as illustrated in FIG. 3, the air modulating cover 125 would have covered the half of the input area of the inlet orifices of the left nozzles 108, but because of the triangular indents on the side edge, the air modulating cover 125 only a small portion of the inlet orifices. FIG. 5B shows the left side edge of the air modulating cover 125 partially covering the inlet orifices of the left nozzles 108. Again, if the side edge were straight, the air modulating cover 125 would have completely covered the inlet orifices, but because of the triangular indents, there are small openings between the air modulating cover 125 and the inlet orifices to let the hot air to flow through. FIG. 5C illustrates the position of the air modulating cover 125 in which the inlet orifices of the left nozzles 108 are finally and completely covered by the cover. Instead of triangular indents, one may alternatively use elliptical indents, semicircular indents or any other shape of the side edges of the air modulating cover 125 that may facilitate a gradual transition between the opening and the closing of the inlet orifices of the nozzles 108 and 109 by the air modulating cover 125.

In yet another alternative embodiment of the present invention, instead of the air modulating cover 125, an air modulator may comprise other feasible means of controlling the flow rate of the hot air through each nozzle. For example, each nozzle may have a gate-like structure which may be shut or open based on an external switch or a command from an external control unit. Such gate-like structure may be placed either at the nozzle inlet orifice, or at the nozzle exit orifice, or at any other suitable place within the nozzle. In another example, the gate-like structure may be capable of varying or adjusting, possibly periodically, the size of the opening through an external control to permit a desired modulation of the flow rate through the nozzle.

The configuration of the nozzles 108, 109 and the air modulating cover 125 for controlling the flow rate of each nozzle as illustrated in FIG. 1 and described above may be operated to cause a time-dependent spatial variation in the net impact or net energy profile of the air impingement applied to the food product 114 placed on the support 112 in the cooking chamber 101 in the following exemplary way. Referring to both FIGS. 1 and 4A, for a predetermined time period, the air modulating cover 125 is positioned on the left side of the base 126 completely covering the inlet orifices of the left nozzles 108, thereby allowing only the right nozzles 109 to provide the air impingement into the cooking chamber 101. As indicated by the general direction 124 of the air impingement from the right nozzles 109, this configuration causes the net impact or energy of the air impingement from the nozzles to be concentrated in the area in the left half of the cooking chamber 101 where the right nozzles 109 are targeting, preferably in the general area in the proximity of the left side of the support 112.

After this time period, as the air modulating cover 125 rotationally slides to the right, away from the inlet orifices of the left nozzles 108, the amount of hot air introduced into the left nozzles 108 increases from zero and at the same time, the amount of the hot air available to the right nozzles 109 starts to decrease. The resulting increasing momentum of the air impingement from the left nozzles 108 in the general direction 123, which collides with the air impingement from the right nozzles 109 at the crossing point 127, would cause the area where the net impact or energy of the air impingement is concentrated to move to the right on the support 112.

Now referring to FIGS. 1 and 4B, for another predetermined time period, the air modulating cover 125 is positioned between the inlet orifices of the left and the right nozzles 108 and 109 so that it allows the equal amounts of the hot air to flow into both the left and the right nozzles 108 and 109. As described above, the respective air impingements having the same energies coming out of the left and the right nozzles 108 and 109 at the same time collide at the crossing point 127, and as a result, the net air impingement is directed vertically downward from the crossing point 127 to the support 112, preferably to the midpoint between the left and the right sides of the support 112. Accordingly, the area where the net impact or energy of the air impingement is concentrated has moved from the left and is now in the general area in the middle of the support 112 or the upper surface of the food product 114 above this general area.

After this time period, as the air modulating cover 125 rotationally slides further to the right, to cover the inlet orifices of the right nozzles 109, the amount of hot air introduced into the right nozzles 109 steadily decreases to zero. The resulting decrease in the momentum of the air impingement from the right nozzles 109 in the general direction 124 would cause the net impact area of the air impingement to further move toward the right on the support 112.

Referring now to both FIGS. 1 and 4C, for yet another predetermined time period, the air modulating cover 125 is now positioned on the right side of the base 126 completely covering the inlet orifices of the right nozzles 109, thereby allowing only the left nozzles 108 to provide the air impingement into the cooking chamber 101. As indicated by the general direction 123 of the air impingement from the left nozzles 108, this configuration causes the net impact or energy of the air impingements from the nozzles to be concentrated in the area in the right half of the cooking chamber 101 where the left nozzles 108 are targeting, preferably in the general area in the proximity of the right side of the support 112.

In this way, the concentration of the net impact/energy of the air impingement from the nozzles may "sweep" across the food product 114 in the cooking chamber 101 from the left to the right and vice versa over time in a controlled manner, thereby facilitating even horizontal distribution of heat energy transfer from the air impingement to the food product and further improving the cooking efficiency of the oven 100. Furthermore, compared to the conventional high-speed cooking ovens based on air impingement, this capability of providing a time-dependent spatial variation of the net impact/energy profile of the air impingement helps to reduce the heat energy loss to the walls of the cooking chamber 101, and minimize the needs for a variable speed motor for the hot air blower 203, the air velocity modulation through dampening, or the modulation of the air heat through adjusting the power of the thermal energy source in the conduit 202. All of these add up to optimize the overall cooking efficiency of the oven 100.

The capability of providing a time-dependent spatial variation of the net impact/energy profile of the air impingement may also be applied to overcome or alleviate the inefficiency arising from the water steam carrying away thermal energy from the food product starting at the temperature of 212° F. as described in the Background section. For example, referring to FIGS. 1 and 4A-C, the air modulating cover 125 is first positioned as illustrated in FIG. 4A so that the net energy of the air impingement is concentrated in the proximity of the surface of the left side of the food product 114. This configuration is maintained until the left side of the food product 114 reaches a temperature slightly under 212° F. Next, the air modulating cover 125 is positioned as illustrated in FIG. 4B, causing the net energy of the air impingement to be generally concentrated in the middle of the food product 114. When the surface of the middle portion of the food product 114 reaches a temperature slightly under 212° F., then the air modulating cover 125 rotationally slides further to the right as illustrated in FIG. 4C, causing the net energy of the air impingement to be concentrated in the proximity of the surface of the right side of the food product 114. This configuration is maintained until the temperature of the surface of the right side of the food product 114 reaches slightly under 212° F. Meanwhile, the heat energies previously transferred to the surfaces of the left side and the middle portion of the food product 114 are dispersed downward below the surface to heat up the inner mass of the food product 114. The above air modulating steps may be repeated, periodically in time, until the internal temperature of the food product 114 in the cooking chamber 101 reaches a desired level.

By maintaining the temperature of the different portions of the surface of the food product 113 slightly under 212° F. and allowing them to disperse the transferred heat energies to the inner mass of the food product alternately at different times, the loss of thermal energy to the water steam from the surface of the food product may be minimized and therefore the efficiency of heat transfer from the air impingement to the food product may be optimized. As to be described below, this can also be done in conjunction with microwave modulations.

In addition, the configuration of the nozzles 108, 109 and the air modulating cover 125 for controlling the flow rate of each nozzle as illustrated in FIG. 1 and described above may be operated in conjunction with the return air exit holes 115, 116 to modulate the air flow below the bottom of the support 112 as follows. For example, the air modulating cover 125 may operate in synchronization with the opening and closing the gates for the left and the right return air exit holes 115 and 116, respectively. When the air modulating cover 125 is positioned as illustrated in FIG. 4A so that the air impingement comes from only the right nozzles 109 toward the left half of the cooking chamber 101, there is consequently a concentration of air flows around the left side of the support 112 compared to the minimal air flows around the right side of the support. By keeping the gates of the left return air exit holes 115 closed and the gates of the right return air exit holes 116 open, the concentration of air flows from around the left side of the support 112 is forced to flow below the full horizontal width of the support 112 from the left end to the right end and exit through the right return air exit holes 116. On the other hand, when the air modulating cover 125 is positioned as illustrated in FIG. 4C so that the air impingement comes from only the left nozzles 108 toward the right half of the cooking chamber 101, there is consequently a concentration of air flows around the right side of the support 112 compared to the minimal air flows around the left side of the support. By keeping the gates of the right return air exit holes 116 closed and the gates of the left return air exit holes 115 open, the concentration of air flows from around the right side of the support 112 is forced to flow below the full horizontal width of the support 112 from the right end to the left end and exit through the left return air exit holes 115. In this way, the air modulating cover 125 and the controller for opening and closing the gates of the return air exit holes 115, 116 can modulate the direction of return air flow beneath the support 112, thereby maximizing the use of the air returning to the return air plenums 119, 120, facilitating the heat transfer to bottom of the support 112 (and consequently the bottom of the food product 114 placed on the support 112) and thereby further optimizing the cooking efficiency of the oven 100. In an alternative embodiment of the present invention, the oven 100 may further comprise another set of nozzles for providing additional hot air flow or air impingements to the bottom of the support 112 to further improve the cooking efficiency of the oven 100.

The nozzles 108, 109 are designed in view of optimizing the air impingements into the cooking chamber 101 and, more importantly, the overall cooking efficiency of the oven 100. Various factors may be taken into account in the design of the nozzles 108, 109 in this regard. As noted in the Background section, the more distant the cross section of an air plume or a hot air column is from the nozzle exit orifice 118, the greater its diameter/cross-sectional area becomes, resulting in reduction in the efficiency of the air impingement. Such expansion of the air plume may be reduced by increasing the speed of the hot air flowing from the nozzles (or the flow rate of the nozzles), which may be achieved by a suitable configuration of the shape and dimension of the nozzles 108, 109. For example, increasing the height of the nozzles may facilitate an increase in the velocity of the air flowing through the nozzles.

However, the flow rate of the nozzles may be limited by the capacity, size, and/or power requirement of the hot air blower 203. In addition, while the increase in the flow rate of the nozzles may improve the efficiency of the air impingement, it needs to be counterbalanced by the concern for the spotting problem as discussed in the Background section, as well as the concern for the potential damages to the food product 114, in particular its visual appearance, due to the rapidly moving hot air. Furthermore, the desire to increase the height of the nozzles 108, 109 to increase their flow rate needs to be counterbalanced by the need to keep the height, and therefore the size, of the oven 100 to a minimum in order to optimize its overall cooking and operating efficiency. When these factors are taken into consideration, it is found that the optimal efficiency in air impingement and optimal cooking efficiency may be achieved with the nozzles 108, 109 having a height of approximately 3 inches and an air speed at the nozzle exit orifice of roughly 25 miles per hour when the food product 114 is between 4 and 12 inches from the nozzle exit orifices.

It is also found that the effective length of the air plume or air impingement generally increases with the increase in the ratio of the area of the nozzle inlet orifice 117 to the area of the nozzle exit orifice 118. Accordingly, the ratio needs to be taken into account when optimizing the efficiency of the air impingement and the overall cooking efficiency of the oven 100. For a nozzle having the height of 3 inches, it is found that the optimal ratio of the nozzle inlet orifice 117 area to the nozzle exit orifice 118 area is roughly 4:1. While a ratio greater than this optimal ratio still leads to a greater effective length in the air plume, a diminished return appears to result from any additional increase in the ratio.

In at least one alternative embodiment of the present invention, instead of a row of nozzles 109 as shown, for example, in FIG. 3, a tube as shown in FIGS. 6B may be used to provide a hot air flow or impingement into a cooking chamber of the oven. FIGS. 6A and 6B illustrate respectively one possible example of a tube before and after assembly. FIG. 6A shows components 608 and 609 for a tube body and one or more slats or spacers 610. These components may be made of sheet metal. FIG. 6B shows the tube 600 after these components are assembled together. Each tube has a tube inlet 601 coupled to an air conduit and/or air inlet housing of the oven to receive a heated gas, and a tube outlet 602 coupled to a cooking chamber of the oven to provide the heated air into the cooking chamber in the form of a hot air plume array. The tube 600 of FIG. 6B could be a cheaper alternative to a row of nozzles while providing a substantially similar performance.

In this exemplary embodiment, the tube 600 may be in the shape of an inverted truncated triangular prism, with the tube inlet 601 corresponding to the base of the prism and the tube outlet 602 corresponding to the truncated top of the prism. As shown in FIG. 6B, the tube inlet 601 is larger than the tube outlet 602 at a ratio optimized to form a tight plume of heated gas. Preferably, the dimension of the tube 600 is designed to optimize the formation of a plume array of heated gas and thereby the performance of the cooking oven. The length of the tube is preferably long enough to establish a directional flow of heated gas in the form of a plume, but not too long so as to require the height of the cooking oven to be objectionable in terms of cost and size considerations. Each tube is preferably wide enough to introduce a sufficient volume of heated gas into the cooking chamber to rapidly cook a food product in the cooking oven. At the same time, the tube outlet 602 is preferably narrow to facilitate the formation of a tight plume. The tube 600 illustrated in FIG. 6B is an exemplary embodiment taking into account these foregoing considerations. Unlike the columns of heated air having a row of circular cross sections, such as the one generated by a row of nozzles 109 shown in FIG. 3, a plume array generated by the tube 600 in FIG. 6B is a planar band of moving heated gas having a rectangular cross section, substantially narrow in one direction but substantially wide in the perpendicular direction.

As shown in FIGS. 6A and 6B, the slats or spacers 610 may be placed within the inside of the tube 600, uniformly spaced in parallel. The spacers 610 serve to prevent microwave energies in a cooking chamber from entering the tube 600. For this purpose, the spacers 610 are preferably less than 1.2 inches spaced apart from each other. FIGS. 6A and 6B shows that each of the spacers 610 may extend from the tube outlet 602 to the tube inlet 601. In an alternative embodiment, each spacer 610 may extend, for example, only about half an inch inward from the tube outlet 602. While both examples serve to substantially prevent microwave entry into the tube 600, it appears that the longer version of the spacer 610, extending from the tube outlet 602 to the tube inlet 601 as shown in FIGS. 6A and 6B, better enables the evenness of the hot air flow along the width of the tube compared to the shorter version.

Figure 6C:
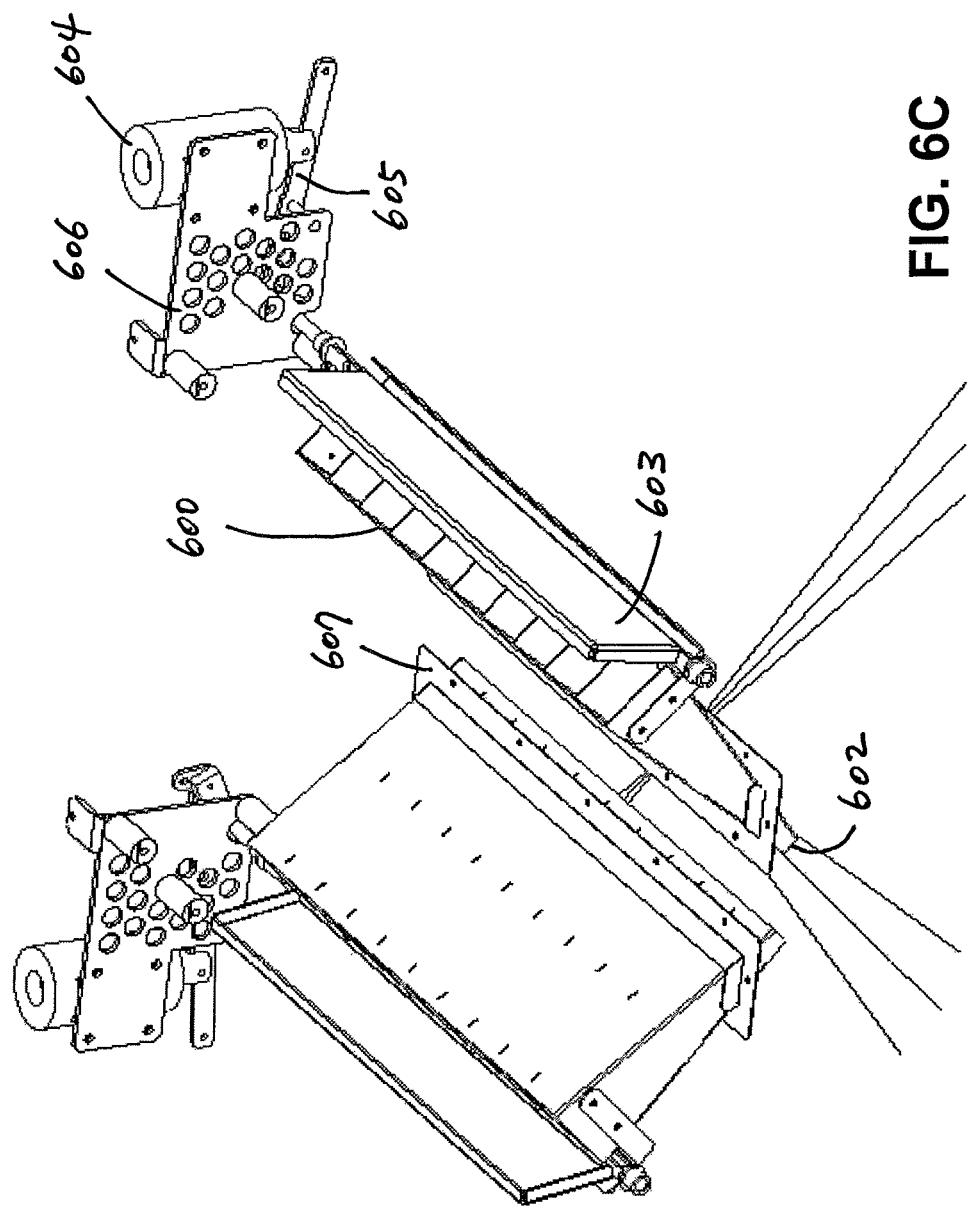
Figure 6D:
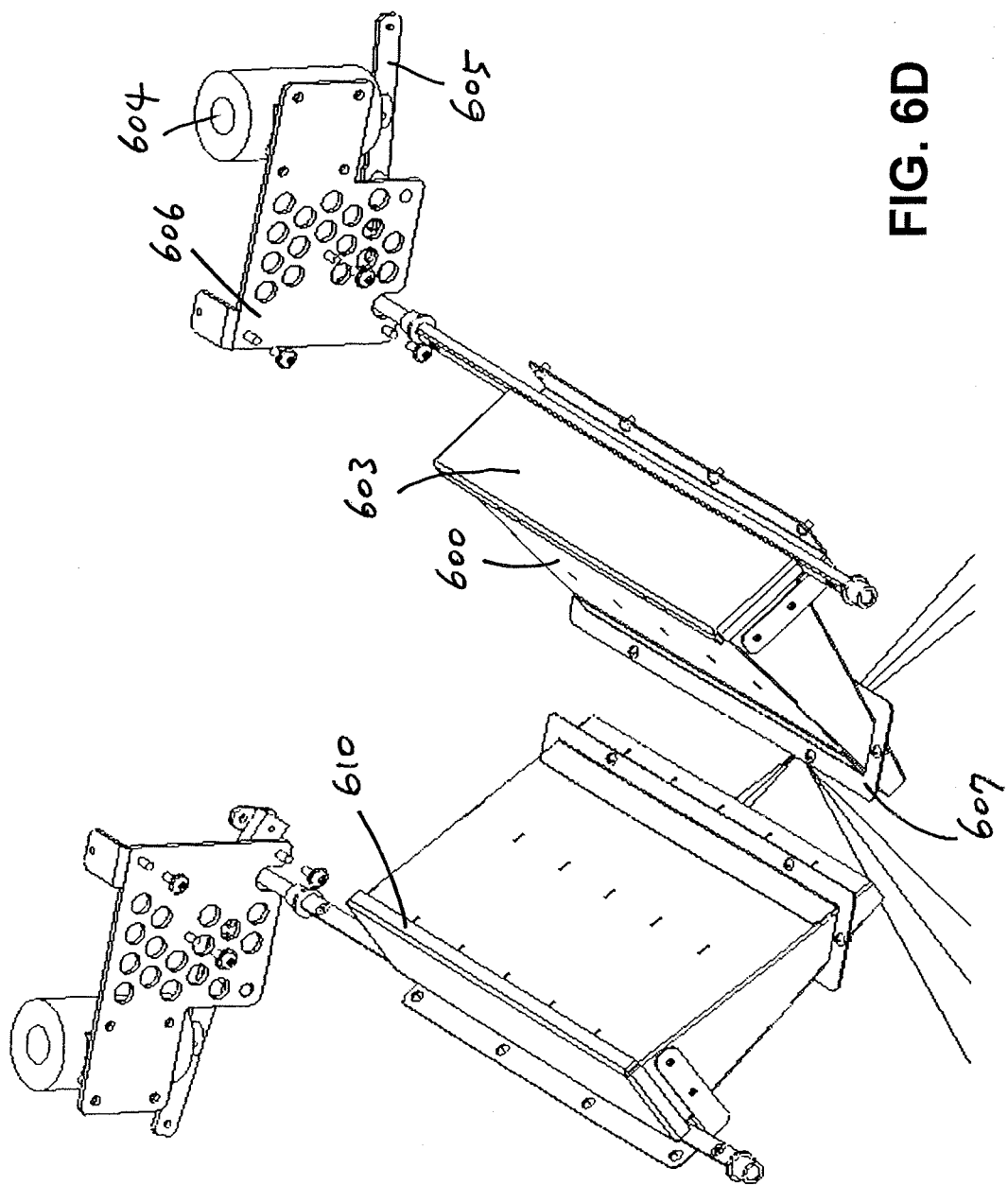

Analogous to the air modulating cover 125 of FIG. 1, a flap 603 as shown in FIG. 6C may be used to control the air flow through the tube 600 by covering and opening the tube inlets 601. The flap 603 may be moved to open and close the tube 600 by a lever arm 605, which may be in turn driven by a solenoid 604. FIG. 6C shows the flap 603 in open position and FIG. 6D shows the flap 603 in closed position. A bracket 606 may be provided to hold the solenoid 604 and the lever arm 605. Preferably, the bracket 606 is designed to minimize heat transfer from the oven plenum to the solenoid 604. As shown in FIG. 6D, the flap 603 preferably has substantially louvered edges 610 or other means to minimize any air leakage through the flap when closed.

In an alternative embodiment not shown in any drawing, the opening and closing of the flap may be driven by one or more motors. In another alternative embodiment, the oven with two tubes may have one motor driving the two flaps for the two tubes. The motor may be configured to open the flap for one tube, while keeping the other tube closed, permitting the alternate opening and closing between the two tubes.

For a cooking oven having a bottom air plenum through which a portion of heated air can be diverted to the bottom of the cooking chamber, the flap 603 may also serve as a damper valve or bottom air diverter. By controlling the degree of opening of the flap 603 for letting the heated air in through the tube 600, one may at the same time control the amount of heated air diverted to the bottom air plenum.

Referring back to FIG. 6C, the surrounding area 607 where the tube 600 penetrates the top of a cooking chamber is preferably firmly sealed to prevent any air leakage into the cooking chamber.

The exemplary embodiment of the present invention incorporating the tube 600 as means of hot air impingement may further comprise a return air opening for allowing the gas from the plume arrays generated by the tube 600 to return from the cooking chamber to the air conduit. One example of such return air opening is the return air exit holes 115, 116 shown in FIG. 1. Another example is one or more rectangular openings. Preferably, the return air opening is positioned substantially at or along the intersection of the direction of the plume array and the wall of the cooking chamber. In this configuration, the heated air from the plume array generated by the tube 600 would strike a food product at an angle and is drawn across the surface of the food product toward its edges and the edge of the support and then finally toward the return air opening. It is found that this configuration further improves the heat transfer between the heated gas and the food product.

Referring back to FIGS. 1 and 2 and turning now to the microwave-cooking feature of the present invention, in addition to the air circulation and impingement means, the hybrid oven 100 further comprises a pair of microwave resonators 104 and 105, which are respectively positioned at the opposite upper corners of the cooking chamber 101 to launch microwave energies respectively generated by magnetrons 102 and 103 into the cooking chamber 101. The microwave resonator 104, 105 may be in the form of a waveguide, such as a slotted waveguide. While the oven 100 according to the exemplary embodiment in FIG. 1 uses two magnetrons 102 and 103, the present invention is not necessarily limited by the number of magnetrons to generate microwave energies to be guided and launched by the microwave resonators 104 and 105 into the cooking chamber 101. Furthermore, depending on the physical configuration of the support and the cooking chamber of the oven, the positions of the microwave resonators may be selected from various possible choices. For example, in an alternative embodiment, a pair of microwave resonators may be positioned respectively at the opposite bottom corners of the cooking chamber. In yet another alternative embodiment, a pair of microwave resonators may be positioned respectively at the upper and the lower portions of a side wall of the cooking chamber to apply the microwave energy sideways to a food product held by a vertically positioned support such as a skewer.

Each microwave resonator 104, 105 may comprise a upper resonator 130, 132 coupled to the corresponding magnetron 102, 103 to receive microwaves therefrom and a lower resonator 131, 133 coupled to the cooking chamber 101. The upper resonator 130, 132 functions to match with the corresponding magnetron 102, 103 and to guide the microwave energy therefrom to the lower resonator 131, 133. The lower resonator 131, 133 functions to match the upper resonator 130, 132 to the cooking chamber 101 and to launch the microwave energy from the upper resonator 130, 132 into the cooking chamber 101. The opening of the lower resonator 131, 133 into the cooking chamber 101 may be covered by a lid made of quartz so that the microwave radiation being transmitted through the lid from the lower resonator may become polarized. It is found that the optimal microwave efficiency may be achieved when the vertical height of the lower resonator 131, 133 equals one quarter of the microwave wavelength in free space (approximately 1.2 inches) and at least one horizontal width of the lower resonator 131, 133 equals the wavelength of a standing microwave within the upper resonator 130, 132 (e.g., about 6.2 inches based on a suitable dimension of the upper resonator).

Figure 7A:
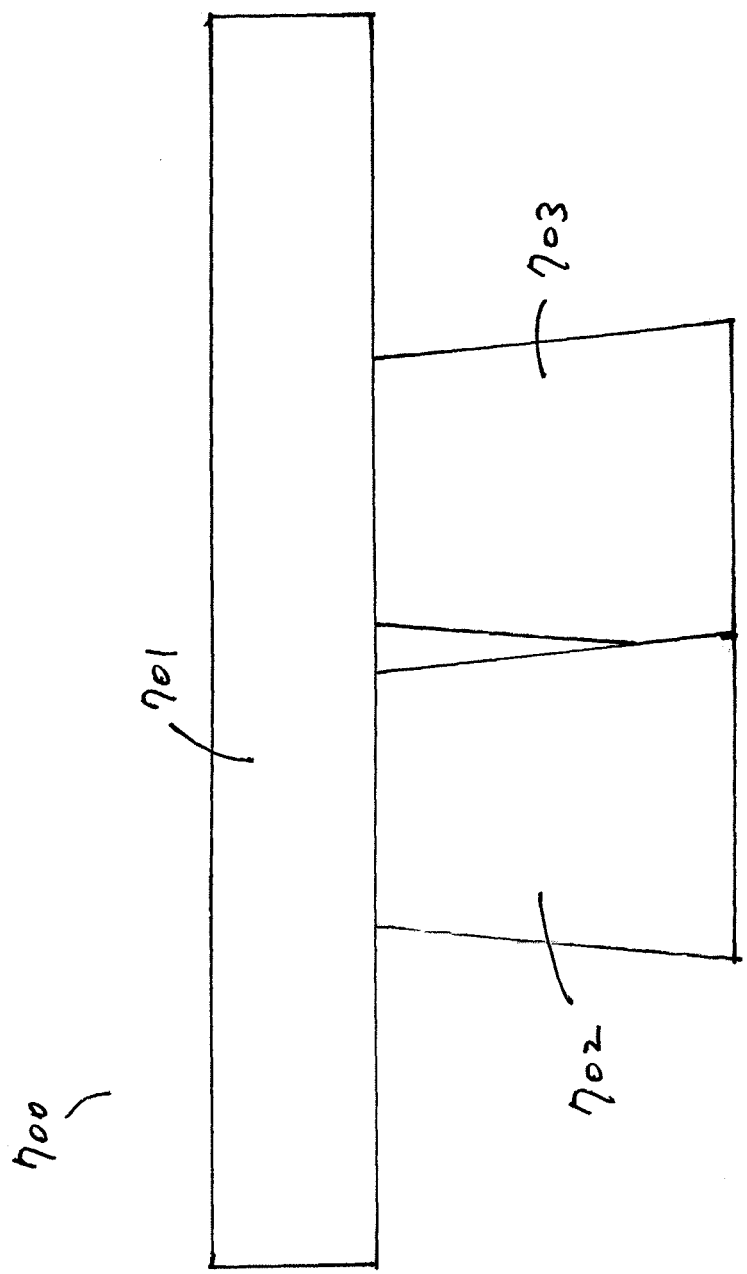
FIGS. 7A, 7B and 7C illustrate various views of a microwave resonator in another alternative embodiment of the present invention.
Figure 7B:
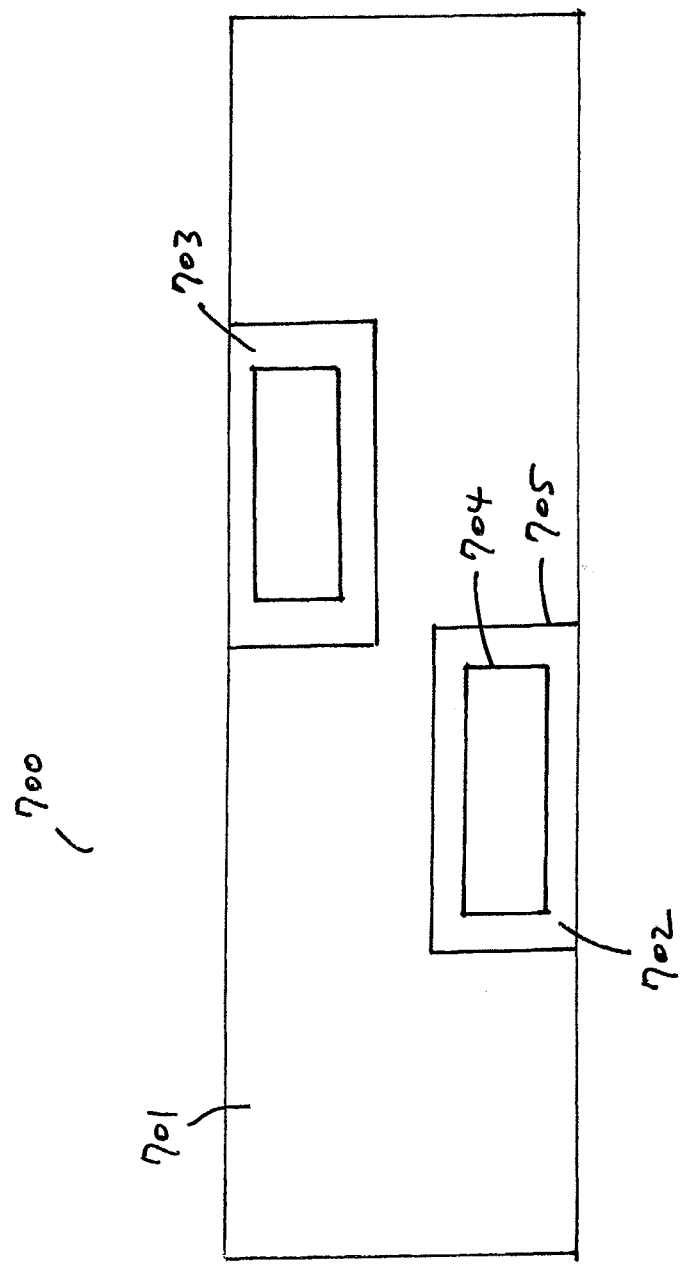
Figure 7C:
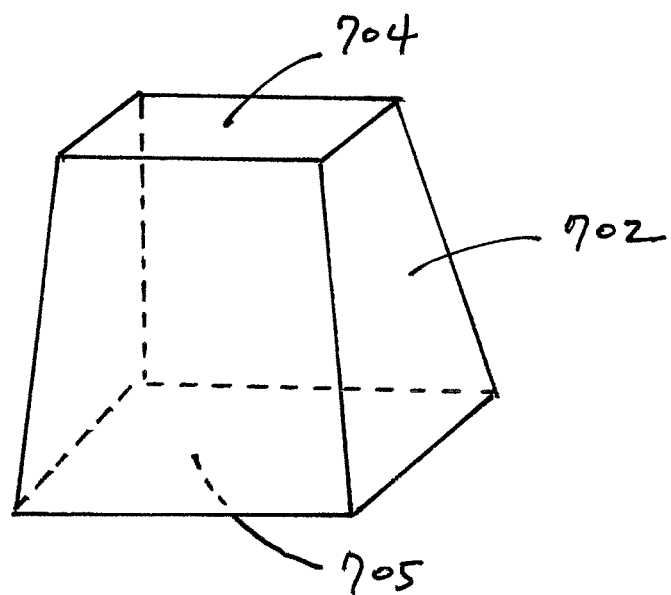

Another exemplary configuration of a microwave resonator is shown in FIGS. 7A, 7B and 7C. FIG. 7A is an elevational side view of a microwave resonator 700; FIG. 7B is a bottom plan view of the microwave resonator 700; and FIG. 7C is a side perspective view of a component of the microwave resonator 700. The configuration of the microwave resonator 700 is designed to optimize the efficiency of microwave-to-heat energy conversion. The microwave resonator 700 comprises an upper resonator 701 coupled to a magnetron and a lower resonator in the form of two feedhorns 702 and 703 with openings to a cooking chamber of the oven.

As shown in FIG. 7C, each feedhorn 702 is in the shape of a truncated rectangular pyramid, with the truncated top forming a top rectangular aperture 704 and the base of the pyramid forming a bottom rectangular aperture 705 of the feedhorn 702. The top aperture 704 is open to the cavity of the upper resonator 701 and the bottom aperture 705 is open to the cooking chamber. The size of the top aperture is smaller than the size of the bottom aperture, and their dimensions and ratio as well as the height of the feedhorn 702, 703 may be adjusted to optimize the microwave efficiency. FIG. 7B shows that the two feedhorns 702 and 703 coupled to the upper resonator 701 are arranged substantially in parallel, but diagonally offset with respect to each other. There may be other alternative arrangements of the two feedhorns 702 and 703 that can further optimize the microwave efficiency.

Referring back to FIGS. 1 and 2, the pair of microwave resonators 104 and 105, in particular their respective lower resonators 131 and 133, are adapted to direct the microwave radiation and energies in respective general directions 121 and 122 as indicated by the dotted lines coming out of the lower resonators 131 and 133. These directions 121 and 122 are at an angle with respect to the vertical axis of the cooking chamber 101 (or the horizontal plane of the support 112) and cross at a point 129 at a distance from the support 112, preferably vertically above the midpoint between the left and the right sides of the support 112. The oven 100 may be configured in such a way that this microwave crossing point 129 may take place above the upper surface of any food product 114 placed on the support 112. In the alternative embodiment wherein the microwave resonators are respectively positioned at the opposite bottom corners of the cooking chamber, the microwave crossing point may be located at a distance below the support. In the yet another alternative embodiment wherein the microwave resonators are positioned on a side wall of the cooking chamber, the microwave crossing point may be located at a horizontal distance from the vertical midpoint of the vertically positioned support.

As indicated by the direction 121, the microwave resonator 104 at the left upper corner of the cooking chamber 101 may be adapted to direct the microwave radiation toward the right half of the cooking chamber 101, preferably toward a general area in the proximity of the right side of the support 112. In mirror symmetry as viewed in FIG. 1, the microwave resonator 105 at the right upper corner of the cooking chamber 101 is adapted to direct the microwave radiation toward the left half of the cooking chamber 101 as indicated by the general direction 122, preferably toward a general area in the proximity of the left side of the support 112. Accordingly, the left and the right microwave resonators 104 and 105 are configured to generally direct the respective microwave energies to the opposite portions of the food product 114 placed on the support 112. It should be appreciated that the "left side" and the "right side" of the support 112 to which the respective microwave energies from the microwave resonators 104 and 105 are generally directed may correspond to any opposite portions of a food product placed on or held by the support. There may be various possible choices for the "left side" and the "right side" of the support depending on the physical configuration of the support and the cooking chamber.

The angle formed by the directions 121 and 122 with respect to the vertical axis of the cooking chamber 101 is determined by where the respective microwave radiation from the microwave resonators 104 and 105 are targeting. As an example, FIG. 1 shows that the microwave directions 121 and 122 form an angle of roughly 45 degrees with respect to the vertical axis of the cooking chamber 101 and meet at the crossing point 129 at an angle of roughly 90 degrees. However, these angles may vary depending on the dimensions of the cooking chamber 101 and the support 112, as well as the relative positions of the microwave resonators 104 and 105.

The oven 100 may further comprise a microwave modulator (not shown in the figures) for controlling the amount of the microwave radiation and their energies coming out of each of the microwave resonators 104 and 105 into the cooking chamber 101. The microwave modulation may be achieved by various means. One example of microwave modulation can be achieved by simply switching on and off the power to each of the magnetrons 102 and 103, either manually or by some suitable automatic control means. In another example, the microwave modulation may be achieved by a voltage regulator capable of varying the voltage applied to each of the magnetron 102 and 103 in a controlled manner. The microwave modulator having an automatic control means may facilitate a periodic change in the power or voltage applied to each of the magnetrons 102 and 103, thereby creating a periodic modulation (e.g., sinusoidal modulation, periodic step function modulation, etc.) in time of the microwave energy radiating out of each of the microwave resonators 104 and 105. By periodically alternating between the left and the right magnetrons 102 and 103, the microwave modulator may provide periodic modulations in the microwave energies respectively from the left and the right microwave resonators 104 and 105 that have the same amplitude and period, but differ in phase by 180 degrees. In addition, by maintaining the total microwave energies generated by both the left and the right magnetrons 102 and 103 to be constant (e.g., by turning off one magnetron while the other magnetron is on, or by providing periodic modulations in the voltages provided to the magnetrons 102 and 103 that have the same amplitude and period, but differ in phase by 180 degrees), the sum of the periodically modulated microwave energies from both the left and the right microwave resonators 104 and 105 likewise remains constant.

The configuration of the microwave resonators 104 and 105, illustrated in FIGS. 1 and 2, in conjunction with the above-described microwave modulator may be operated to cause a time-dependent spatial variation in the net microwave energy applied to the food product 114 placed on the support 112 in the cooking chamber 101 in the following exemplary way. Referring back to FIG. 1, for a predetermined time period, the microwave modulator turns on only the left magnetron 102 while keeping the right magnetron 103 turned off, thereby allowing microwave energy to radiate only from the left microwave resonator 104. As indicated by the general direction 121 of the microwave radiation from the left microwave resonator 104, this configuration causes the net microwave energy to be concentrated in the area in the right half of the cooking chamber 101, preferably in the general area in the proximity of the right side of the support 112.

After this time period, the microwave modulator keeps both the left and the right magnetrons 102 and 103 on for another predetermined time period, thereby allowing both the left and the right microwave resonators 104 and 105 to radiate microwave energies into the cooking chamber. It is found that in general, the microwaves radiating from both the left and the right microwave resonators 102 and 103 do not interfere with each other so as to cancel the net microwave energy. Accordingly, it is observed that in this configuration, the net microwave energy is largely concentrated in the middle portion of the support 112, preferably in the general area around the midpoint between the left and the right sides of the support 112 and preferably in the center of the food product 114 placed on the support 112 in the cooking chamber 101.

Next, for yet another predetermined time period, the microwave modulator keeps the right magnetron 103 on while maintaining the left magnetron 102 turned off of the power, thereby allowing only the right microwave resonator 105 to radiate the microwave energy into the cooking chamber 101. As indicated by the general direction 122 of the microwave radiation from the right microwave resonator 105, this configuration causes the net microwave energy to be concentrated in the area in the left half of the cooking chamber 101, preferably in the general area in the proximity of the left side of the support 112.

In this way, the concentration of the net microwave energy radiated from the left and the right microwave resonators 104 and 105 may "sweep" across the food product 114 in the cooking chamber 101 from the right to the left and vice versa over time in a controlled manner, thereby facilitating even horizontal distribution of heat energy transfer from the microwave radiation to the food product and further improving the microwave efficiency and the overall cooking efficiency of the oven 100. Furthermore, compared to the conventional high-speed cooking ovens based on microwave, this selective directionality of the net microwave energy helps to reduce the microwave radiation loss to the walls or other spaces of the cooking chamber 101, thereby optimizing the microwave efficiency and the overall cooking efficiency of the oven 100.

The capability of providing a time-dependent spatial variation in the net microwave energy may also be applied to overcome or alleviate the inefficiency arising from the water steam carrying away thermal energy from the food product starting at the temperature of 212° F. as described in the Background section. For example, referring to FIG. 1, the microwave modulator first keeps the left magnetron 102 on while maintaining the right magnetron 103 turned off so that the net microwave energy is concentrated in the proximity of the right side of the food product 114. This configuration is maintained until the right side of the food product 114 reaches a temperature slightly under 212° F. Next, the microwave modulator keeps both the left and the right magnetrons 102 and 103 on, causing the net microwave energy to be generally concentrated in the middle of the food product 114. When the middle portion of the food product 114 reaches a temperature slightly under 212° F., then the microwave modulator turns off the left magnetron 102, while keeping the right magnetron 103 on, causing the net microwave energy to be concentrated in the proximity of the left side of the food product 114. This configuration is maintained until the temperature of the left side of the food product 114 reaches slightly under 212° F. Meanwhile, the heat energies previously transferred to the right side and the middle portion of the food product 114 are dispersed throughout the inner mass of the food product 114. The above microwave modulating steps may be repeated, periodically in time, until the internal temperature of the food product 114 in the cooking chamber 101 reaches a desired level.

By maintaining the temperature of the different portions of the surface of the food product 113 slightly under 212° F. and allowing them to disperse the transferred heat energies to the inner mass of the food product alternately at different times, the loss of thermal energy to the water steam from the surface of the food product may be minimized and therefore the efficiency of heat transfer from the microwave energy to the food product may be optimized.

Under the present invention, the operation settings of the oven 100 may comprise various possible combinations and sequences of open and close configurations of the left and the right nozzles 108 and 109 and on and off configurations of the left and the right magnetrons 102 and 103. In addition, the operations of the air modulator (e.g., in the form of the movable air modulating cover 125 in FIG. 1) for controlling the air impingement and the microwave modulator for controlling the microwave radiation may be coordinated and synchronized with each other to achieve the desired heat transfer effect. In one possible configuration, the air modulator and the microwave modulator may operate in phase in the following exemplary way. Referring to FIG. 1, for a predetermined time period, the air modulating cover 125 is positioned to keep the right nozzle 109 open and the left nozzle 108 closed (as illustrated in FIG. 4A), while the microwave modulator keeps the right magnetron 103 on and the left magnetron 102 off. For the next predetermined time period, the air modulating cover 125 is positioned to keep both the right and the left nozzles 109 and 108 open (as illustrated in FIG. 4B), while the microwave modulator keeps both the right and the left magnetrons 103 and 102 on. For the third predetermined time period, the air modulating cover 125 is positioned to keep the left nozzle 108 open and the right nozzle 109 closed (as illustrated in FIG. 4C), while the microwave modulator keeps the left magnetron 102 on and the right magnetron 103 off. As a result, the effects of the net air impingement and microwave energies "sweeping" across the food product 114 from one side to the other in time are in phase and therefore amplified.

On the other hand, since the heating by the air impingement and the microwave heating cause different kinds of impacts on the food product 114, one might instead desire to have the air modulator and the microwave modulator to operate out of phase so as to avoid the simultaneous heating of the same portion or side of the food product 114 in the cooking chamber 101 by both the air impingement and the microwave energy. To illustrate one exemplary out-of-phase operation by the air modulator and the microwave modulator, an alternative embodiment capable of opening and closing both the left and the right nozzles 108 and 109 at the same time is used. For the first predetermined time period, the air modulator keeps the right nozzle 109 open and the left nozzle 108 closed, while the microwave modulator keeps the left magnetron 102 on and the right magnetron 103 off. For the next predetermined time period, the air modulator keeps both the right and the left nozzles 109 and 108 closed, while the microwave modulator keeps both the right and the left magnetrons 103 and 102 on. For the third predetermined time period, the air modulator keeps the left nozzle 108 open and the right nozzle 109 closed, while the microwave modulator keeps the right magnetron 103 on and the left magnetron 102 off. For the fourth predetermined time period, the air modulator keeps the right nozzle 109 open and the left nozzle 108 closed, while the microwave modulator keeps the left magnetron 102 on and the right magnetron 103 off, as in the first predetermined time period. For the fifth predetermined time period, the air modulator keeps both the right and the left nozzles 109 and 108 open, while the microwave modulator keeps both the right and the left magnetrons 103 and 102 off. For the sixth and the final predetermined time period of one cycle, the air modulator keeps the left nozzle 108 open and the right nozzle 109 closed, while the microwave modulator keeps the right magnetron 103 on and the left magnetron 102 off, as in the third predetermined time period. As the result of this out-of-phase operations by the air modulator and the microwave modulator, there is no simultaneous heating of the same portion or side of the food product 114 by both the air impingement and the microwave energy.

Other features of the hybrid oven 100 are also designed in view of optimizing the microwave efficiency, i.e., to maximize the amount of the microwave energy directed to the food product 114 and minimize the amount of the microwave energy lost to the cavities, plenums, magnetrons, etc. or radiated away from the food product 114. For example, the diameter of the nozzle exit orifice 118 is sized to prevent microwave energies from entering the nozzle and thereby becoming dissipated away rather than being applied to the food product 114. It is found that the diameter of approximately 0.75 inches for the nozzle exit orifice 118 may be able to keep microwave energies from entering the nozzles, thereby optimizing the microwave efficiency in the oven 100.

The support 112 may be adapted to rotate around the vertical axis 135 at its center. Such rotation of the support 112 help to alleviate the problem of horizontal unevenness in the microwave heat energy distribution. In addition, the oven 100 may further comprise an elevator or an elevating mechanism to control and modulate the height of the support 112 with respect to the top and bottom of the cooking chamber 101. As an example, FIG. 1 shows the support 112 elevated to a higher position 113 vertically along the axis 135. This may be achieved either manually or by a suitable electromechanical elevation control means. Such modulation of the height of the support 112 may be used to alleviate the problem of vertical unevenness in the microwave heat energy distribution.

The optimal microwave efficiency may also be achieved by matching the size of the cooking chamber 101 with the microwave load. It is found that the optimal matching can be achieved by sizing preferably all, but at least one, of the vertical height, and horizontal width and depth of the cooking chamber 101 (as viewed in FIG. 1) in integer multiples of the microwave wavelength (approximately 4.82 inches in free space). Such dimensions of the cooking chamber 101 facilitate the accommodation of standing microwaves in the cooking chamber 101, thereby minimizing the reflection of microwaves at the walls of the cooking chamber and the resulting loss of the microwave energy to the cavities, plenums, magnetrons, etc. Hence, to optimize the microwave efficiency, preferably all, but at least one, of the vertical height, and the horizontal width and depth of the cooking chamber 101 of the oven 100 is sized in integer multiples of the microwave wavelength, or selected from one of 4.82 inches, 9.64 inches, 14.46 inches, 19.28 inches, 24.10 inches, etc.

Figure 9A:
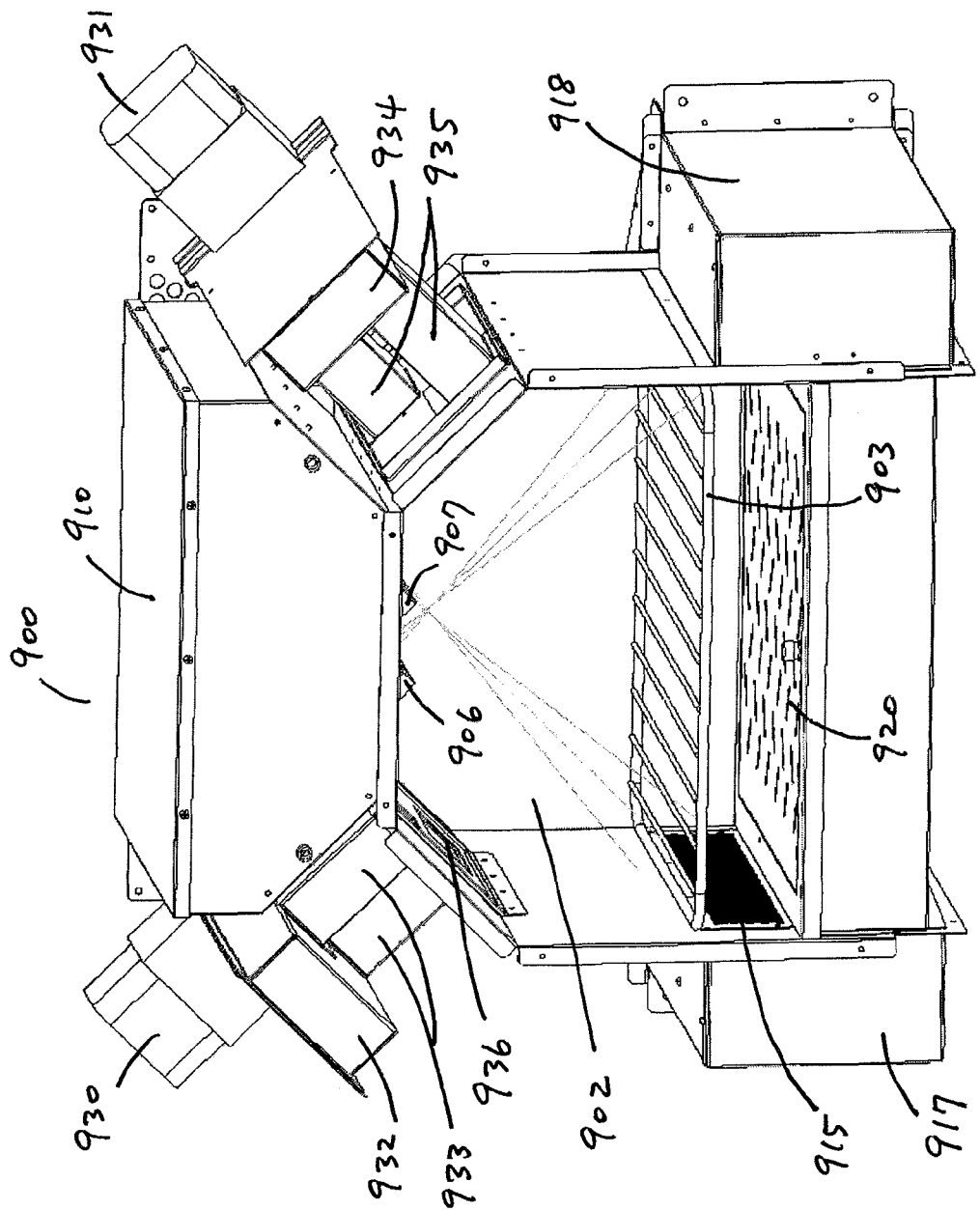
FIGS. 9A, 9B, and 9C illustrate various views of another embodiment of the present invention.
Figure 9B:
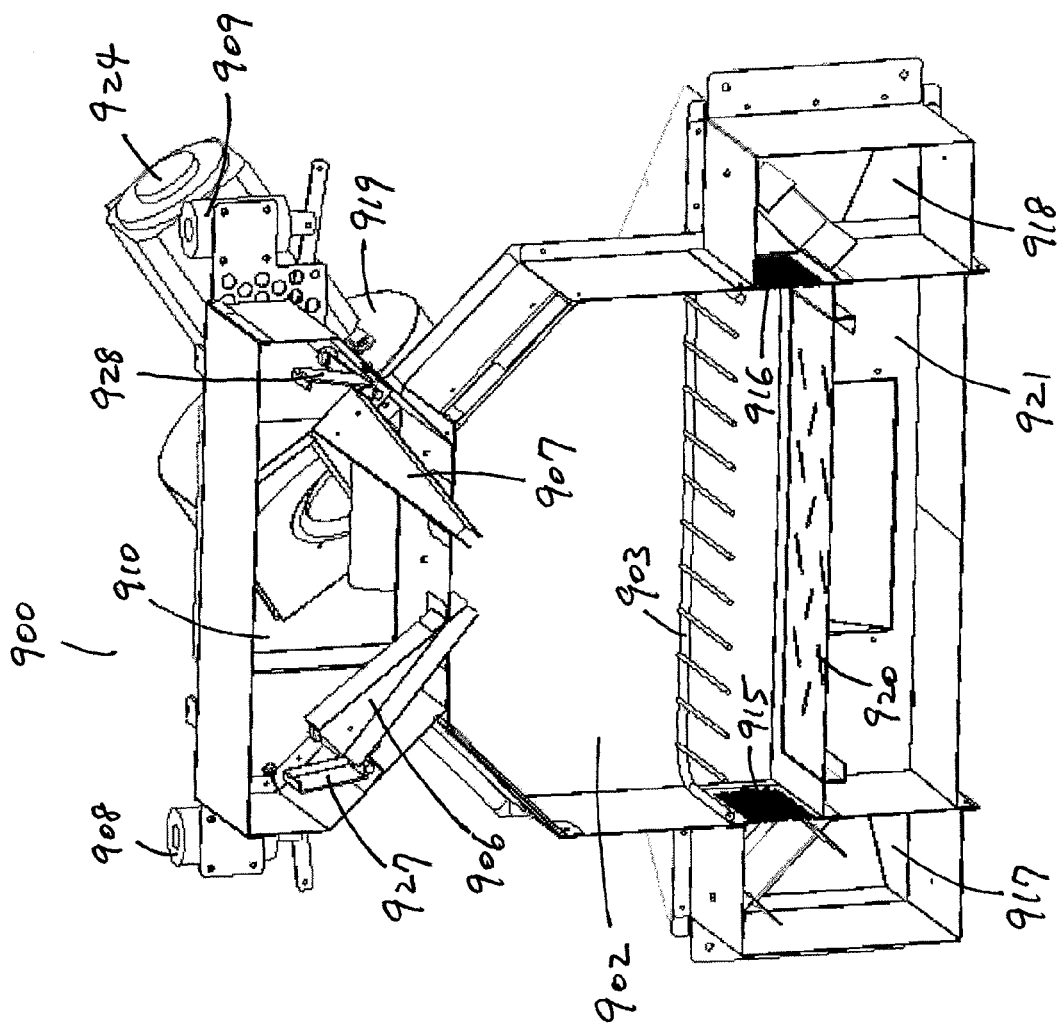
Figure 9C:
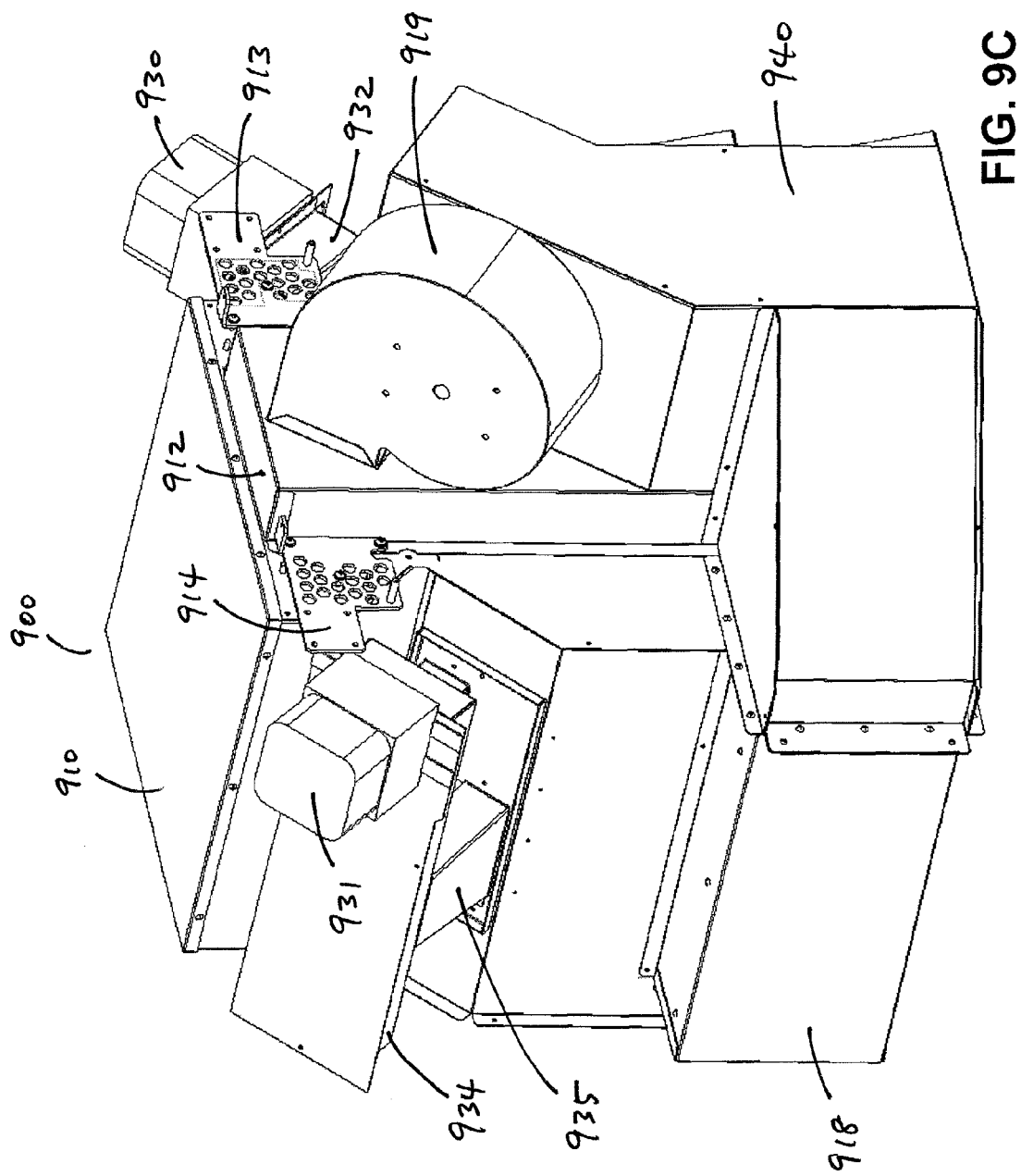
Figure 10A:
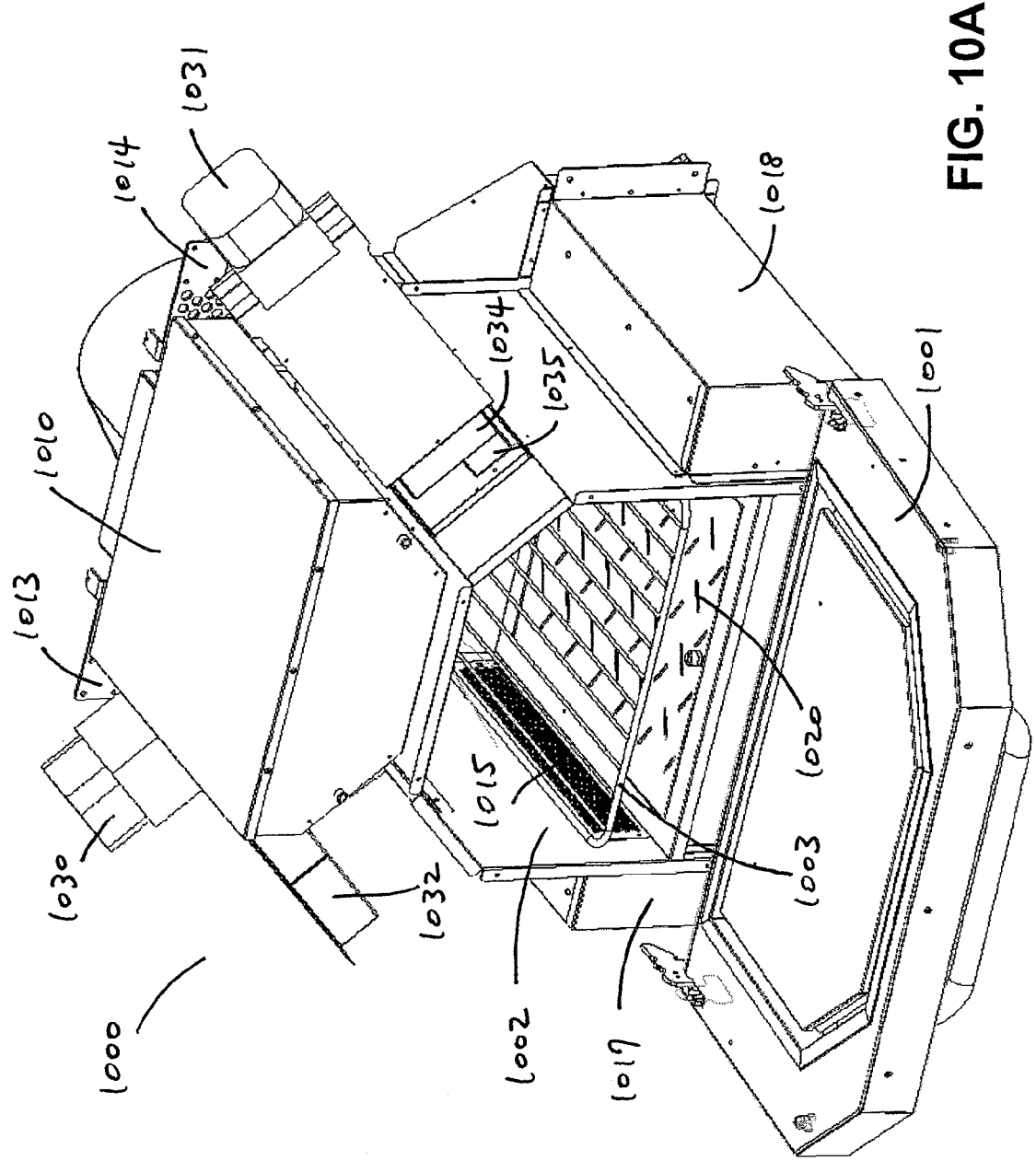
FIGS. 10A, 10B, and 10C illustrate various views of another embodiment of the present invention.

The present invention accommodates cooking ovens of various sizes and capacities. FIGS. 8A, 8B, 8C, 8D, and 8E illustrate various partial views of an exemplary small version of a hybrid cooking oven based on a combination of hot air impingement and microwave; FIGS. 9A, 9B, and 9C illustrate various partial views of an exemplary medium version, which is in many aspects similar to the one shown in FIGS. 1-3; and FIGS. 10A, 10, and 10C illustrate various partial views of an exemplary large version. These figures are merely schematic illustrations based on various partial views and are not intended to be complete or reflect the exact dimensions, scales or relative proportions of the oven or components thereof, or the full engineering specification thereof, which should be apparent to those skilled in the art. Furthermore, while these figures show various internal oven components exposed to the outside for illustrative purposes, the commercial versions of these ovens would most likely have a housing to encase these components for safety, aesthetic and other reasons. In addition, although these exemplary embodiments of the present invention are shown to use two tubes of the type shown in FIGS. 6B, 6C, and 6D as means of hot air impingement and one or more microwave resonator of the type shown in FIGS. 7A, 7B, and 7C as means of microwave energy propagator, it should be appreciated that other various alternative types and configurations may be used in their places.

Figure 8A:
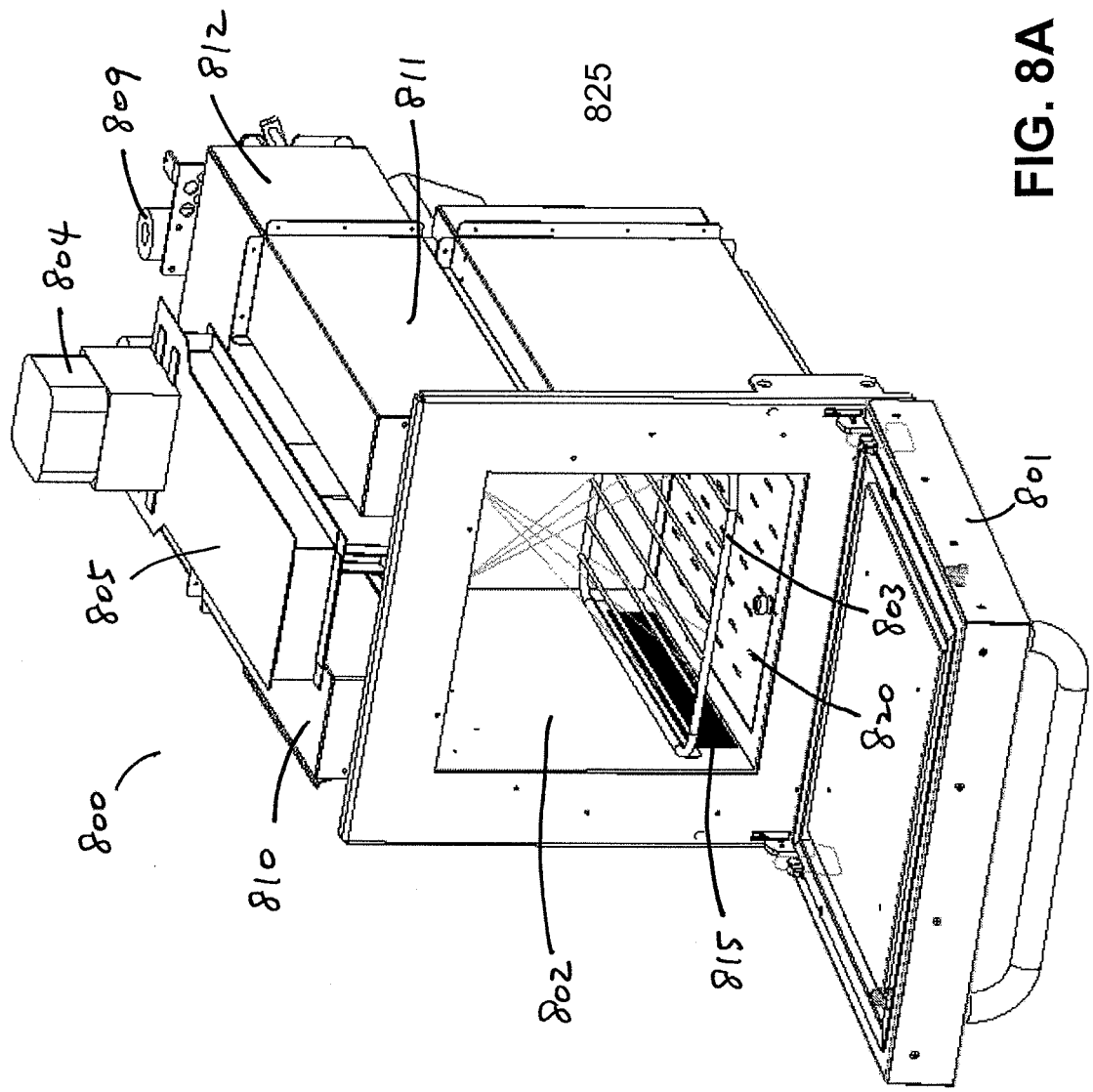
FIGS. 8A, 8B, 8C, 8D, 8E, 8F, and 8G illustrate various views of other embodiments of the present invention.
Figure 8B:
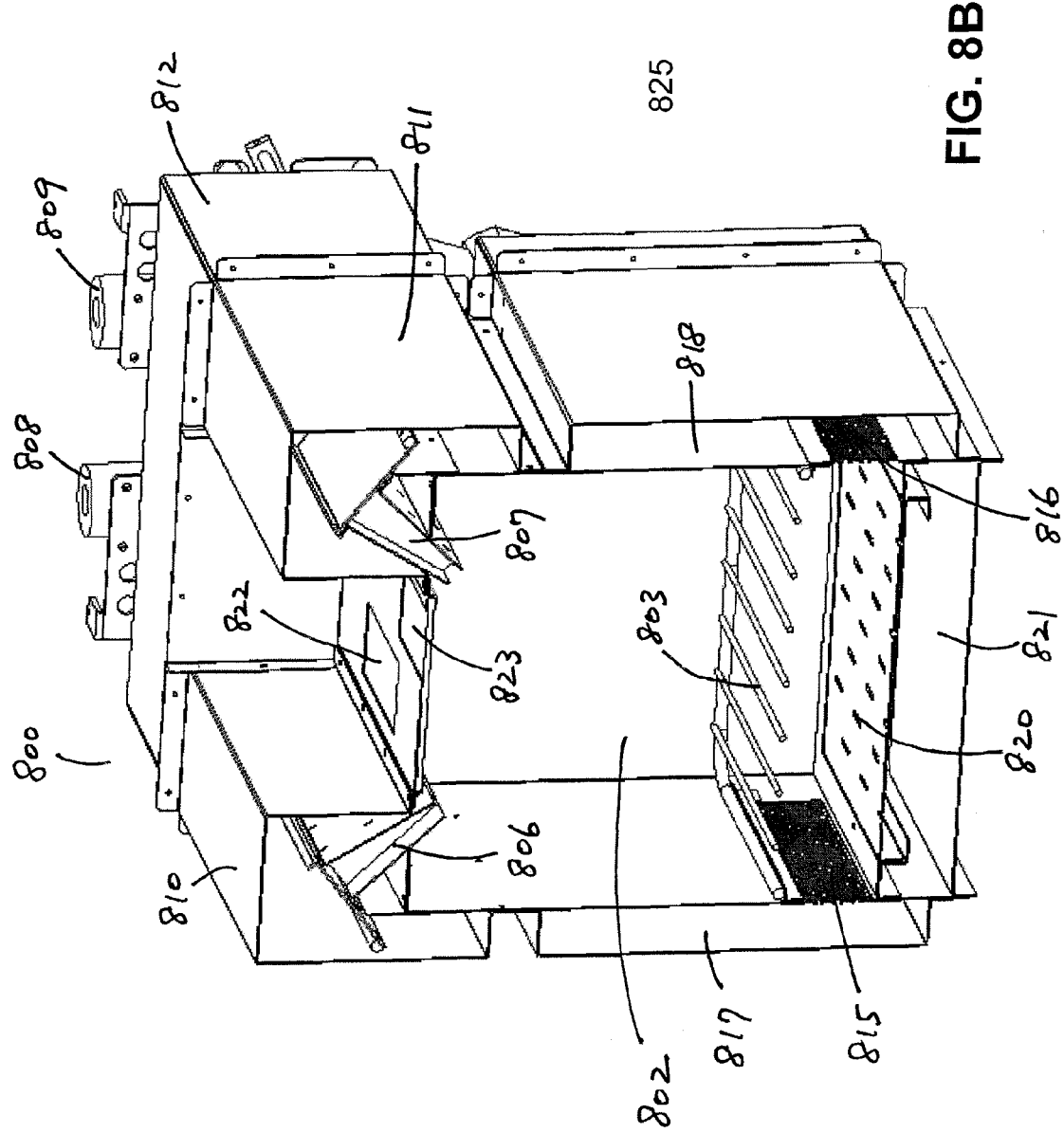
Figure 8C:
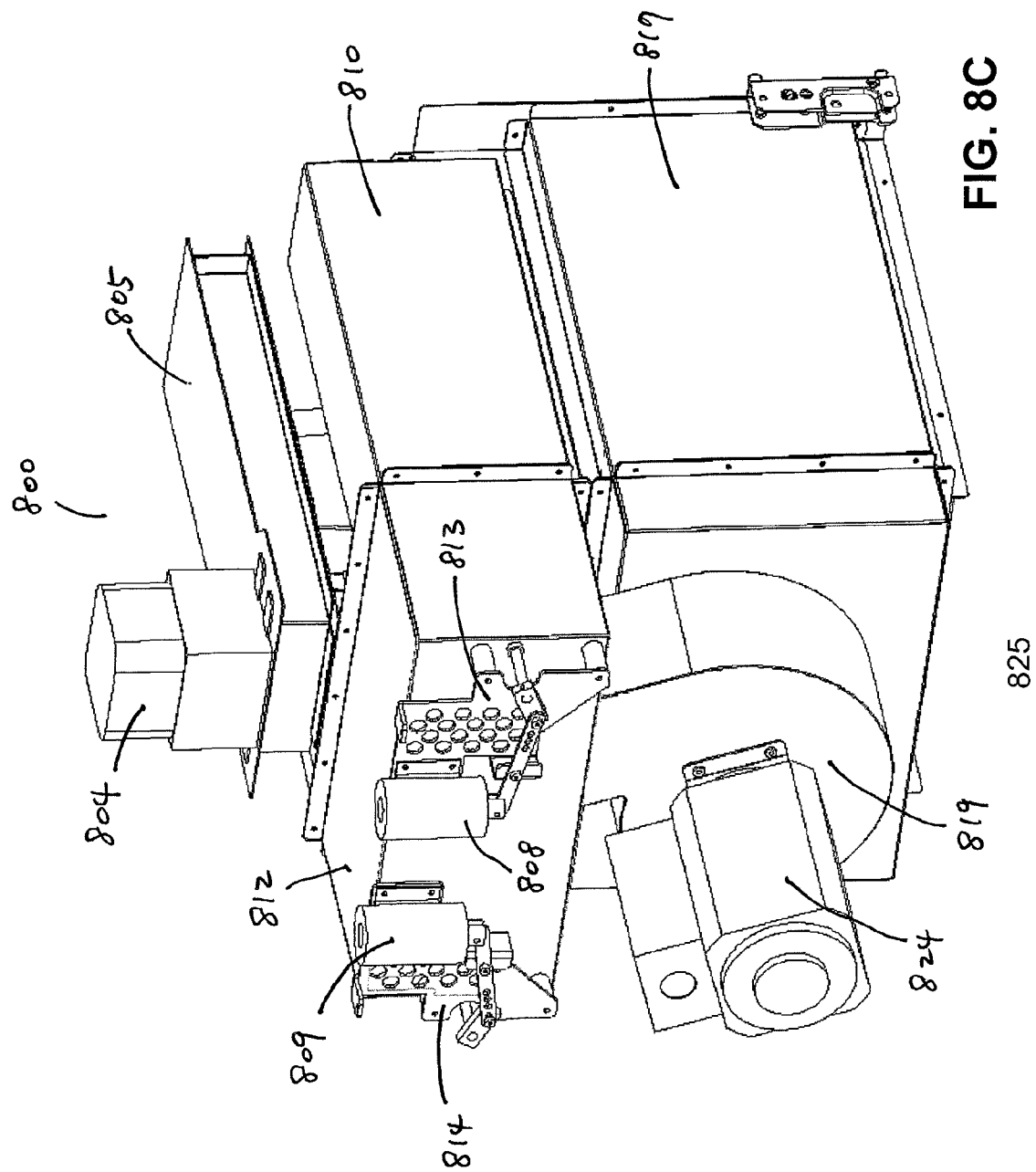

Referring now to FIGS. 8A, 8B, and 8C, therein illustrated is an exemplary small version of a hybrid cooking oven 800. FIG. 8A is a frontal perspective view of the hybrid oven 800 with its door 801 open; FIG. 8B is a partial frontal cross-sectional view of the oven 800 of FIG. 8A, with the view of a magnetron 804 and microwave resonator 805 taken out for illustrative purpose; and FIG. 8C is a perspective view of the oven 800 from the left rear. The oven 800 comprises a cooking chamber 802, which is adapted to receive a food product on a support 803 for cooking. The exemplary external dimension of the hybrid cooking oven 800 is 14 inches wide, 28 inches deep, and 22 inches tall, and the exemplary dimension of the cooking chamber 802 is 9.6 inches wide, 12 inches deep, and 9.6 inches tall.

As means for providing hot air impingement from the top of the cooking chamber, the oven 800 has two tubes 806 and 807 for generating plume arrays of heated gas and introducing them into the cooking chamber 802. These tubes 806 and 807 may be positioned on the top of the cooking chamber as shown in FIG. 8B. Each of the tubes 806 and 807 comprises a tube inlet coupled to an air inlet housing and a tube outlet coupled to the cooking chamber 802. The tubes 806 and 807 may be of the type and configuration shown in FIGS. 6B, 6C, and 6D, and may further comprise a flap for each tube as shown in FIGS. 6B, 6C, and 6D for covering and opening the tube inlet to control the heated air flow through the tube 806, 807. Solenoids 808 and 809 may be used to drive the flaps to open and close. As noted above, brackets 813 and 814 may be used to hold the solenoids 808 and 809 respectively so that the heat transfer from the oven plenum to the solenoids can be minimized.

In this exemplary embodiment, the tube inlets for the two tubes 806 and 807 are respectively encased in separate air inlet housings 810 and 811, which are connected through an air conduit 812. The tubes 806 and 807 are configured to respectively direct their plume arrays toward substantially opposite portions of the support 803 at a non-zero angle less than 90 degrees with respect to the surface of the support. In this configuration, the directions of the plume arrays from the tubes 806 and 807 cross each other above the food product placed on the support 803.

The oven 800 further comprises return air openings 815 and 816 on both side walls of the cooking chamber 802. The return air opening 815 is preferably positioned substantially at or along the intersection of the direction of the plume array generated by the tube 807 and the side wall of the cooking chamber 802. Likewise, the return air opening 816 is preferably positioned substantially at or along the intersection of the direction of the plume array generated by the tube 806 and the side wall of the cooking chamber 802. The return air openings 815 and 816 allow the gas from the plume arrays generated by the tubes 807 and 806 to return from the cooking chamber 802 to the air conduit 812 via return air plenums 817 and 818 and one or more intermediate conduits, respectively.

The air conduit 812 allows gaseous communication from other parts of the oven to the two air inlet housings 810 and 811. While not shown in the figures, a thermal energy source, such as parallel heating coils, may be coupled to or disposed in the air conduit 812 to heat the air disposed therein. The oven 800 has a hot air blower 819 which serves to circulate the air between the cooking chamber 802, the return air plenums 817 and 818, the air conduit 812, and the air inlet housings 810 and 811. The hot air blower 819 is driven by a blower motor 824, which may be a single speed or variable speed.

The oven 800 also has bottom air inlets 820 which are positioned below the support 803 substantially at the bottom of the cooking chamber 802 to direct a hot air flow to the underside of the support 803. This hot air to the bottom air inlets 820 is supplied by a bottom air inlet plenum 821, which is connected to, and diverts the heated gas from, the air conduit 812. In this oven 800, the hot air blower 819 serves to circulate the heated gas not only to the air inlet housings 810 and 811 on the top of the cooking chamber 802, but also to the bottom air inlet plenum 821 below the bottom of the cooking chamber.

The hybrid oven 800 also has one magnetron 804 for generating microwave energy. The magnetron 804 is coupled to a microwave resonator 805, which is configured to propagate the microwave energy from the top of the cooking chamber straight down into the cooking chamber 802. The microwave resonator 805 may be of the type shown in FIGS. 7A, 7B, and 7C, and may comprise an upper resonator (shown in FIGS. 8A and 8C) and two feedhorns (not shown in the figures) as a lower resonator, whose bottom ends respectively protrude into the cooking chamber 802 through the two rectangular apertures 822 and 823 on the top of the cooking chamber, as shown in FIG. 8B. Alternatively, the microwave resonator 805 may be any other waveguide known in the art.

The inventors have discovered empirically that an oven in accordance with the embodiment shown in FIGS. 8A-8E is more efficient than prior art high-speed cooking ovens. For instance, prior art high-speed cooking ovens draw a maximum current of approximately 26 amperes (from a 220 volt mains supply), and exhibit a standby energy loss (i.e., the amount of energy the oven dissipates when it is in an idle, non-cooking, mode) of approximately 1.7 kilowatts per hour (at an internal cooking chamber temperature of 500 degrees Fahrenheit). In contrast, the inventors have empirically determined that an oven in accordance with the embodiment shown in FIGS. 8A-8E draws a maximum of approximately 13.5 amperes (from a 208-240 volt mains supply), and dissipates only approximately 0.9 kilowatts per hour in standby energy. Thus, this standby energy loss is approximately 55% of the energy dissipated by prior art high-speed cooking ovens.

While part of this increased efficiency can be attributed to the smaller size of the cooking chamber in ovens made in accordance with the embodiments shown in FIGS. 8A, 8B, 8C, 8D, and 8E, the inventors have discovered that the specific arrangement of the various plenums (i.e., air conduits, air inlet housings, bottom air inlet plenums, rear plenums, and return air plenums) within an oven in accordance with the embodiments of the present invention is a previously unappreciated aspect of the improved cooking efficiency of ovens manufactured in accordance with the present invention. In prior art ovens, at least one side wall, and typically both side walls, of the cooking chamber is exposed to either the outside surface of the oven (with perhaps insulation or microwave waveguides disposed between the wall of the cooking chamber and the outside surface of the oven) or to the controls of the oven.

In contrast, in accordance with an embodiment of the present invention, every wall of the cooking chamber has at least one plenum between it and the housing of the oven, and thus every wall of the cooking chamber is exposed to heat. As shown in FIG. 8B, air inlet housings 810 and 811, which provide a heated gas (e.g., air) into cooking chamber 802 through tubes 806 and 807, sit atop cooking chamber 802. The only portion of the top of cooking chamber 802 not covered by a plenum is that portion that accepts microwave resonator 805 (see FIG. 8C). Nonetheless, it will be readily apparent to one of ordinary skill in the art that microwave resonator 805 is itself a source of an appreciable amount of heat. Therefore, even though this portion of the top of cooking chamber 802 is not covered by a plenum, it is exposed to heat. One of ordinary skill in the art could choose to cover this portion of the top of cooking chamber 802 using either or both of air inlet housings 810 and 811 if microwave resonator 805 were located elsewhere in oven 800.

A portion of each air inlet housing 810, 811 is also disposed adjacent the corresponding side wall of cooking chamber 802. In a presently preferred embodiment, this portion of the air inlet housing covers approximately the top 20% of the side wall.

The bottom of cooking chamber 802, which includes bottom air inlets 820, has bottom air inlet plenum 821 disposed beneath it. Bottom air inlet plenum 821 also provides air into cooking chamber 802 through bottom air inlets 820.

The remainder of the plenums that substantially surround cooking chamber 802 serve to return the gas (e.g., air) from the cooking chamber to the one or more blowers (e.g., hot air blower 819 shown in FIG. 8C) that are used by oven 800. Return air plenum 817 is disposed adjacent the left side wall of cooking chamber 802. Return air plenum 818 is disposed adjacent the right side wall of cooking chamber 802, which is located across cooking chamber 802 from the left side wall. In a presently preferred embodiment, each return air plenum 817, 818 covers approximately the bottom 75% of its corresponding side wall of the cooking chamber. Thus, there is a small portion of each side wall of cooking chamber 802 that is not covered by air inlet housing 810, 811 or return air plenum 817, 818. However, one of ordinary skill in the art could choose to cover this small portion of each side wall of cooking chamber 802 using air inlet housing 810, 811, return air plenum 817, 818, or some other suitable plenum.

Return air plenums 817, 818 return the air from cooking chamber 802 (through return air openings 815 and 816, respectively) to rear plenum 825. Rear plenum 825 gathers the return air from return air plenums 817, 818 and feeds it to air conduit 812 via hot air blower 819 (see FIG. 8C), from which it is again provided to cooking chamber 802 by two paths: (1) through air inlet plenums 810, 811, and their respective tubes 806, 807; and (2) through bottom air inlet plenum 821 and bottom air inlets 820.

Figure 8D:
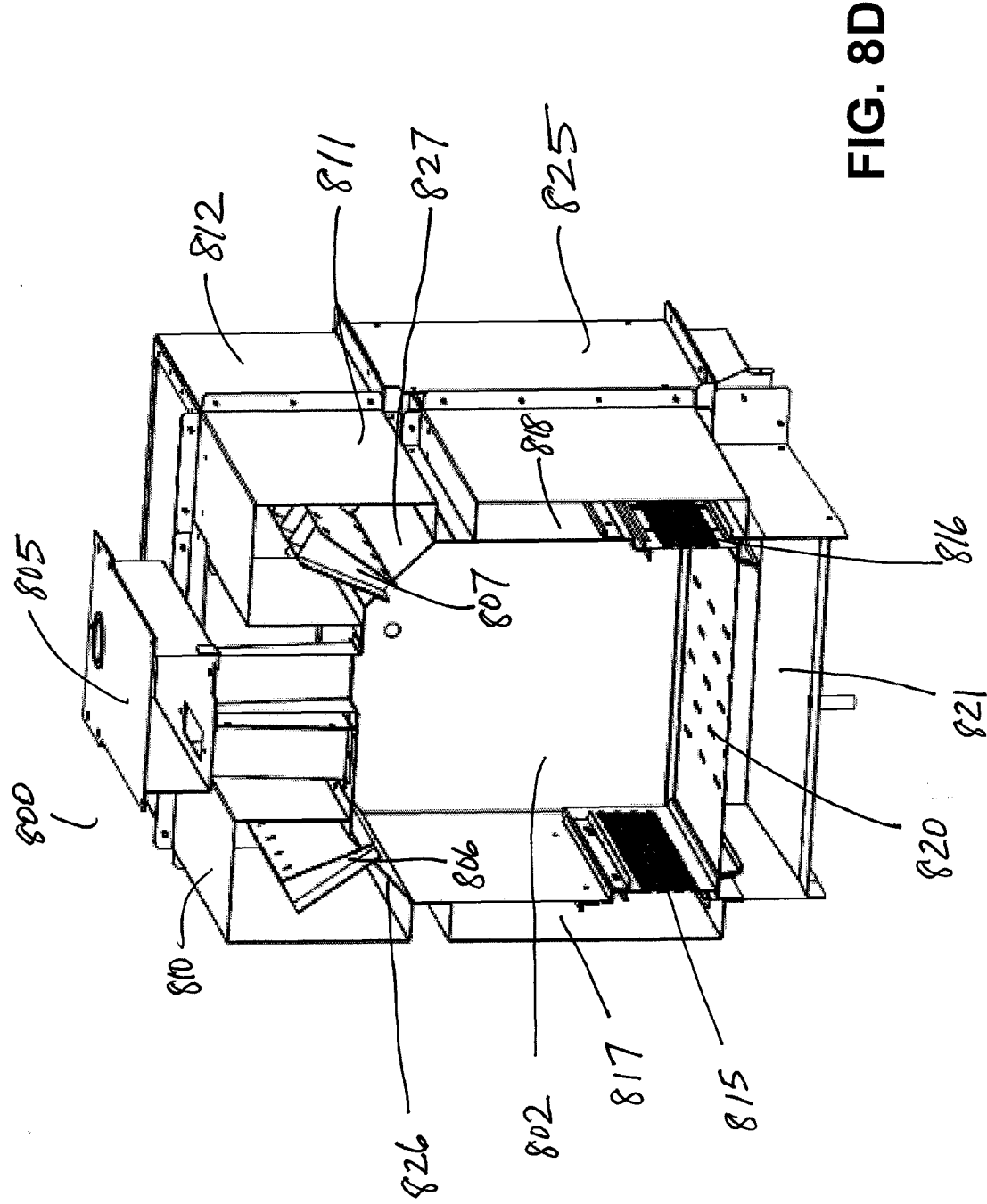
Figure 8E:
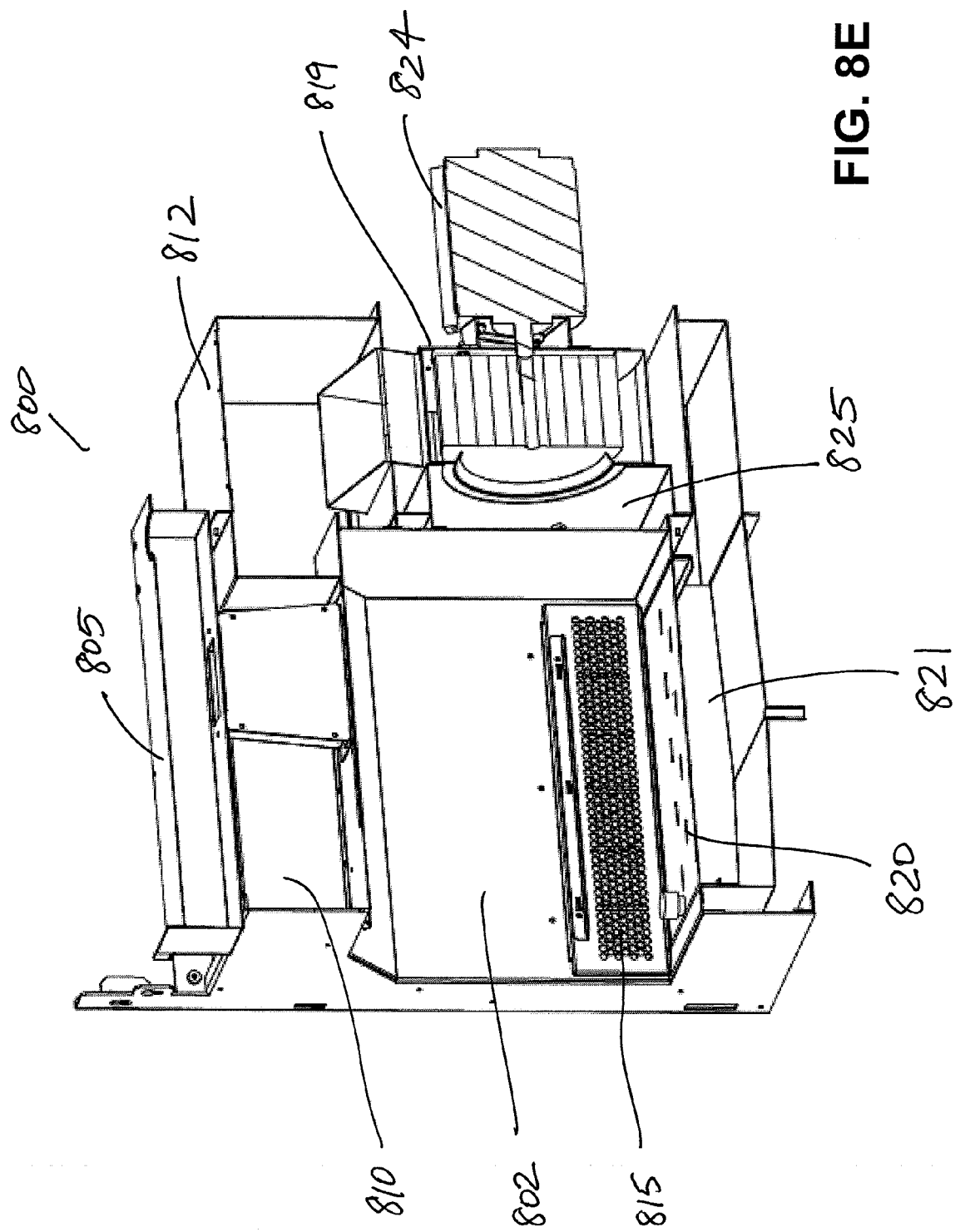
Figure 8F:
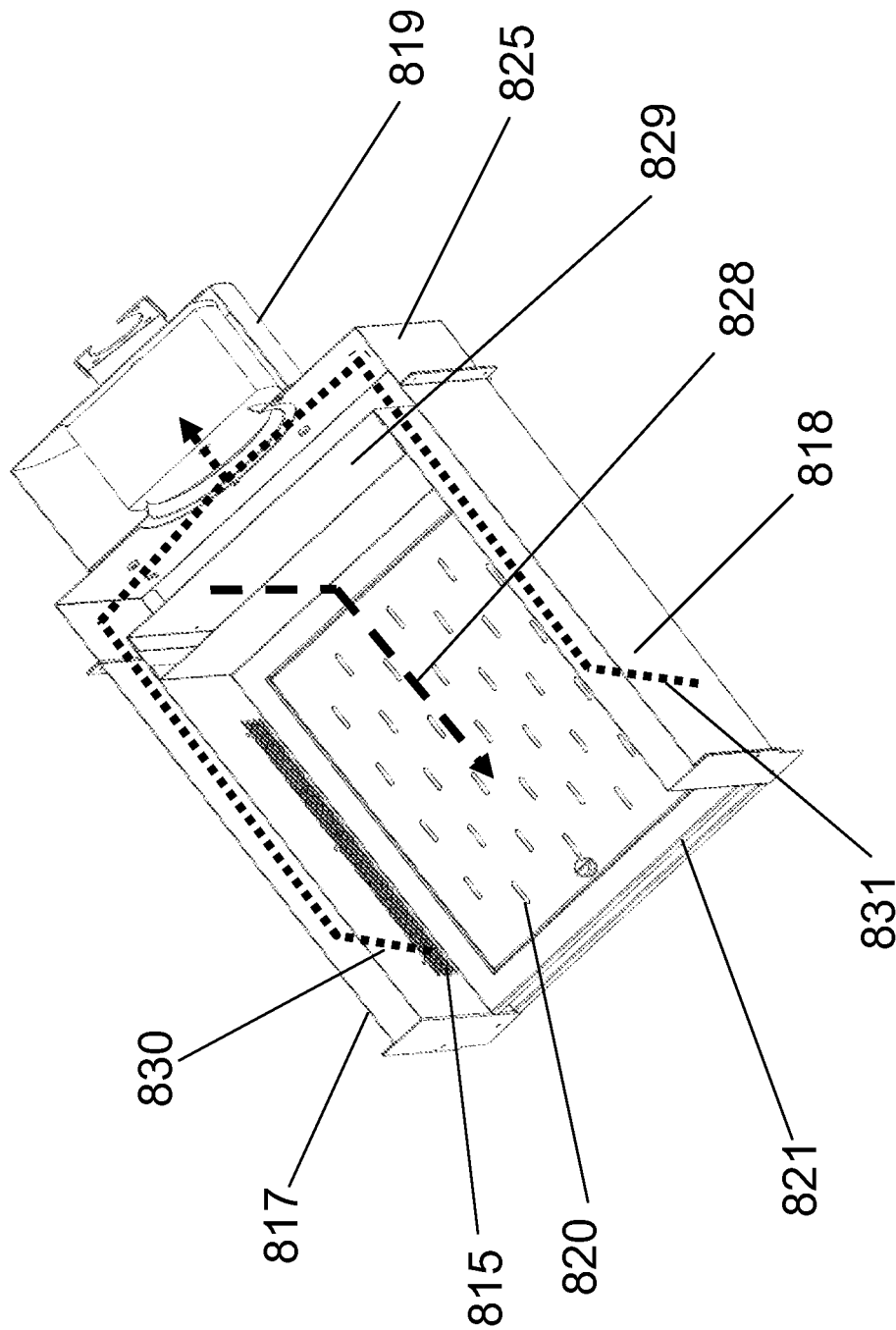

FIG. 8F shows the supply and return air flow paths for air that is provided into cooking chamber 802 through bottom air inlet plenum 821 and bottom air inlets 820 in the embodiment shown in FIGS. 8A-C. As shown in FIGS. 8A-C and 8F, air is fed from air conduit 812 to bottom air inlet plenum 821 through a path 828 that runs through supply plenum 829, which is located behind and contiguous with cooking chamber 802. Air is returned from cooking chamber 802 to blower 819 along a path 830 that runs through return air opening 815, return air plenum 817, and rear plenum 825. One of ordinary skill in the art will understand that air is also returned from cooking chamber 802 to blower 819 along a parallel path 831 on the other side of the oven that runs through return air opening 816 (not shown), return air plenum 818, and rear plenum 825.

Figure 8G:
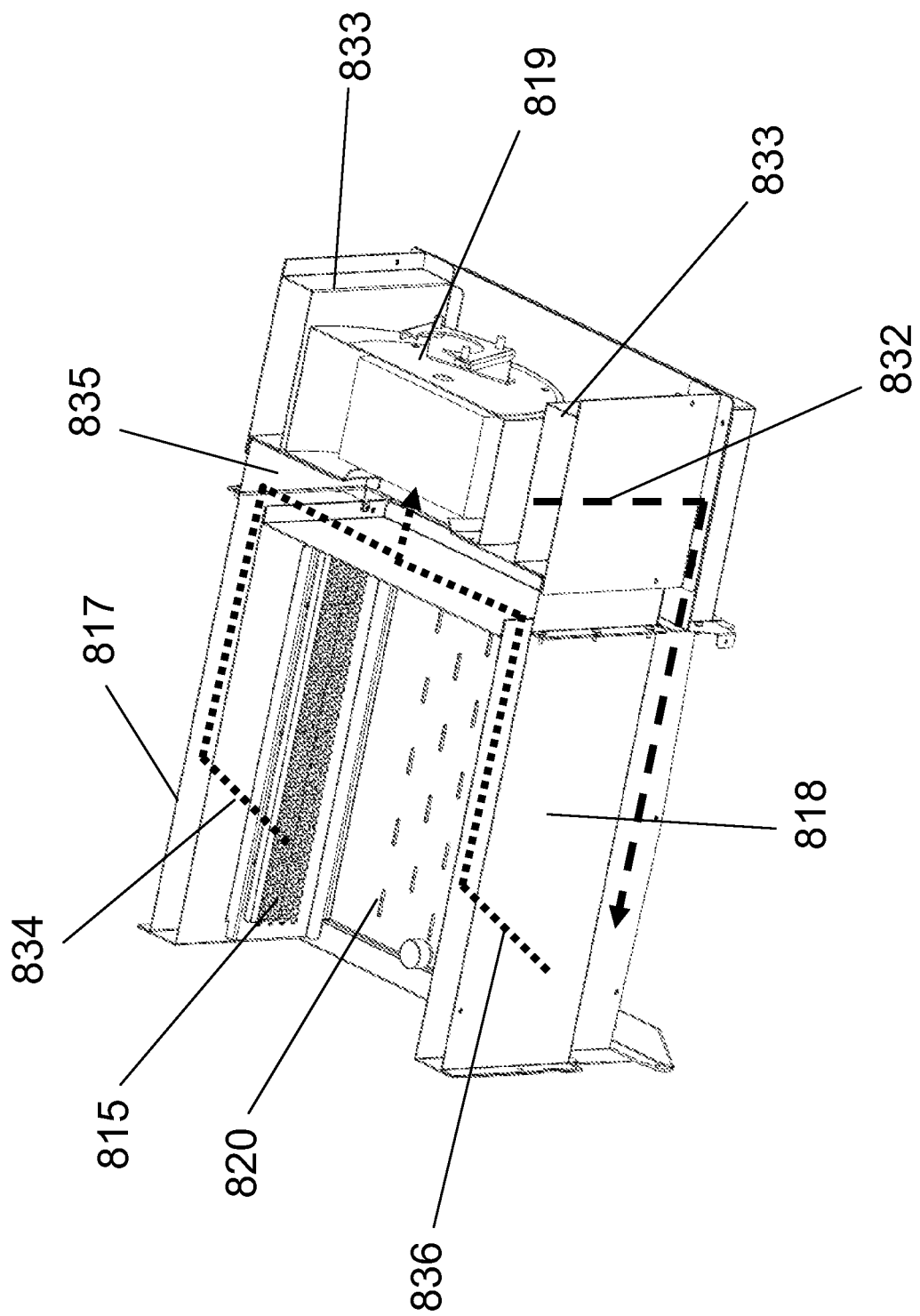

An alternative embodiment of oven 800 is shown in FIGS. 8D, 8E, and 8G. This embodiment of oven 800 is essentially the same as the embodiment shown in FIGS. 8A-8C and 8F, except that the top of cooking chamber 802 does not meet each of the side walls at a right angle. Instead, in FIGS. 8D and 8E, the top of cooking chamber 802 and each side wall share a beveled portion 826, 827, through which respective tubes 806, 807 protrude into cooking chamber 802. Like the embodiment of oven 800 shown in FIGS. 8A-8C, the embodiment shown in FIGS. 8D and 8E has air inlet housings 810, 811 that sit atop cooking chamber 802. The only portion of the top of cooking chamber 802 not covered by a plenum is that portion that accepts microwave resonator 805. A portion of each air inlet housing 810, 811 is also disposed adjacent the corresponding side wall of cooking chamber 802.

FIG. 8G shows the supply and return air flow paths for air that is provided into cooking chamber 802 through bottom air inlet plenum 821 and bottom air inlets 820 in the embodiment shown in FIGS. 8D and 8E. As shown in FIGS. 8D, 8E, and 8G, air is fed from air conduit 812 to bottom air inlet plenum 821 through a supply path 832 that runs through a vertical drop 833 located adjacent to, but separate from, blower 819. One of ordinary skill in the art will understand that a parallel supply path (not shown) runs through a second vertical drop 833 located on the other side of the oven. Air is returned from cooking chamber 802 to blower 819 along a path 834 that runs through return air opening 815, return air plenum 817, and an air gathering plenum 835, which is located behind and contiguous with cooking chamber 802. (By providing the air gathering plenum 835 behind and contiguous with cooking chamber 802, the length of the oven can be shortened so that it can easily fit on existing countertops.) One of ordinary skill in the art will understand that air is also returned from cooking chamber 802 to blower 819 along a parallel path 836 on the other side of the oven that runs through return air opening 816, return air plenum 818, and air gathering plenum 835.

In accordance with the embodiments of the present invention shown in FIGS. 8A-8G, the plenum that is located behind and contiguous with cooking chamber 802 is filled with hot air, which insulates cooking chamber 802 from heat loss. This is true regardless of whether that plenum is used to supply air to bottom plenum 821 (e.g., supply plenum 829 shown in FIG. 8F) or to gather air from side return plenums 817, 818 (e.g., air gathering plenum 835 shown in FIG. 8F).

Thus, in accordance with the embodiments of the present invention, the various plenums of the oven are disposed such that together they substantially surround cooking chamber 802. Each wall of cooking chamber 802 has a plenum adjacent to it. As a result, the gas (e.g., air) that is provided to oven 800 by its blower(s) 819 contacts at least a portion of each of the top, the bottom, the rear wall, and the side walls of cooking chamber 802 as it flows outside cooking chamber 802 from the blower(s) 819 through the plenums before returning to the blower(s) 819. In this way, the presence of plenums adjacent each of the walls of cooking chamber 802 serves to "insulate" the cooking chamber with hot air, thereby increasing the cooking efficiency of oven 800.

Referring now to FIGS. 9A, 9B, and 9C, therein illustrated is an exemplary medium version of a hybrid cooking oven 900. This exemplary embodiment is similar to the hybrid oven 100 illustrated in FIGS. 1-3 in many aspects. FIG. 9A is a frontal perspective view of the hybrid oven 900; FIG. 9B is a partial frontal cross-sectional view of the oven 900 of FIG. 9A, with the view of magnetrons 930, 931 and their associated microwave resonators 932, 933, 934, 935 taken out for illustrative purpose; and FIG. 9C is a perspective view of the oven 900 from the right rear. The oven 900 comprises a cooking chamber 902, which is adapted to receive a food product on a support 903 for cooking. The exemplary external dimension of the hybrid cooking oven 900 is 28 inches wide, 27 inches deep, and 24 inches tall, and the exemplary dimension of the cooking chamber 902 is 14.4 inches wide, 14.4 inches deep, and 10.2 inches tall.

As means for providing hot air impingement from the top of the cooking chamber, the oven 900 has two tubes 906 and 907 for generating plume arrays of heated gas and introducing them into the cooking chamber 902. These tubes 906 and 907 may be positioned on the top of the cooking chamber as shown in FIG. 9B. Each of the tubes 906 and 907 comprises a tube inlet coupled to an air inlet housing 910 and a tube outlet coupled to the cooking chamber 902. The tubes 906 and 907 may be of the type and configuration shown in FIGS. 6B, 6C, and 6D, and may further respectively comprise flaps 927 and 928 for covering and opening the tube inlet to control the heated air flow through the tubes 906 and 907. Solenoids 908 and 909 may be used to respectively drive the flaps 927 and 928 to open and close. As noted above, brackets 913 and 914 may be used to hold the solenoids 908 and 909 respectively so that the heat transfer from the oven plenum to the solenoids can be minimized.

In this exemplary embodiment, the tube inlets for the two tubes 906 and 907 are both encased in a single air inlet housing 910. The tubes 906 and 907 are configured to respectively direct their plume arrays toward substantially opposite portions of the support 903 at a non-zero angle less than 90 degrees with respect to the surface of the support. In this configuration, the directions of the plume arrays from the tubes 906 and 907 cross each other above the food product placed on the support 903.

The oven 900 further comprises return air openings 915 and 916 on both side walls of the cooking chamber 902. The return air opening 915 is preferably positioned substantially at or along the intersection of the direction of the plume array generated by the tube 907 and the side wall of the cooking chamber 902. Likewise, the return air opening 916 is preferably positioned substantially at or along the intersection of the direction of the plume array generated by the tube 906 and the side wall of the cooking chamber 902. The return air openings 915 and 916 allow the gas from the plume arrays generated by the tubes 907 and 906 to return from the cooking chamber 902 to an air conduit 940 via return air plenums 917 and 918, respectively.

While not shown in the figures, a thermal energy source, such as parallel heating coils, may be coupled to or disposed in the air conduit 940 to heat the air disposed therein. The oven 900 has a hot air blower 919 which serves to circulate the air between the cooking chamber 902, the return air plenums 917 and 918, the air conduit 940, and the air inlet housing 910. The hot air blower 919 is driven by a blower motor 924 (not shown in FIG. 9C), which may be a single speed or variable speed.

The oven 900 also has bottom air inlets 920 which are positioned below the support 903 substantially at the bottom of the cooking chamber 902 to direct a hot air flow to the underside of the support 903. The hot air to the bottom air inlets 920 is supplied by a bottom air inlet plenum 921. In this oven 900, the hot air blower 919 serves to circulate the heated gas not only to the air inlet housing 910 on the top of the cooking chamber 902, but also to the bottom air inlet plenum 921 below the bottom of the cooking chamber. A portion of the heated air from the hot air blower 919 is diverted to the bottom air inlet plenum 921 via a bottom air conduit 912.

The hybrid oven 900 also has two magnetrons 930 and 931 for generating microwave energies for microwave cooking. Each of the magnetrons 930 and 931 is coupled to a microwave resonator for propagating the microwave energy into the cooking chamber 902. The microwave resonator may be of the type shown in FIGS. 7A, 7B, and 7C, and may comprise an upper resonator 932, 934 coupled to the magnetron 930, 931, and a lower resonator in the form of two feedhorns 933, 935, with an opening to the cooking chamber 902. Alternatively, the microwave resonators may be any other waveguides known in the art.

FIG. 9A shows bottom apertures 936 of the feedhorns 933 for directing the microwave energy propagation generated by the magnetron 930 and guided by the upper resonator 932 from the upper left corner of the top of the cooking chamber 902 substantially toward the right portion of the support 903. In this exemplary embodiment as shown in FIG. 9A, the microwave resonators 932, 933 on the upper left corner of the top of the cooking chamber 902 and the microwave resonators 934, 935 on the upper right corner of the top of the cooking chamber 902 are configured to respectively direct the microwave energies to propagate generally towards substantially opposite portions of the support 903 at a non-zero angle less than 90 degrees with respect to the surface of the support. In this configuration, the propagation directions of the microwave energies from the microwave resonators from the both sides cross each other at a distance from the support in the cooking chamber 902.

Figure 10B:
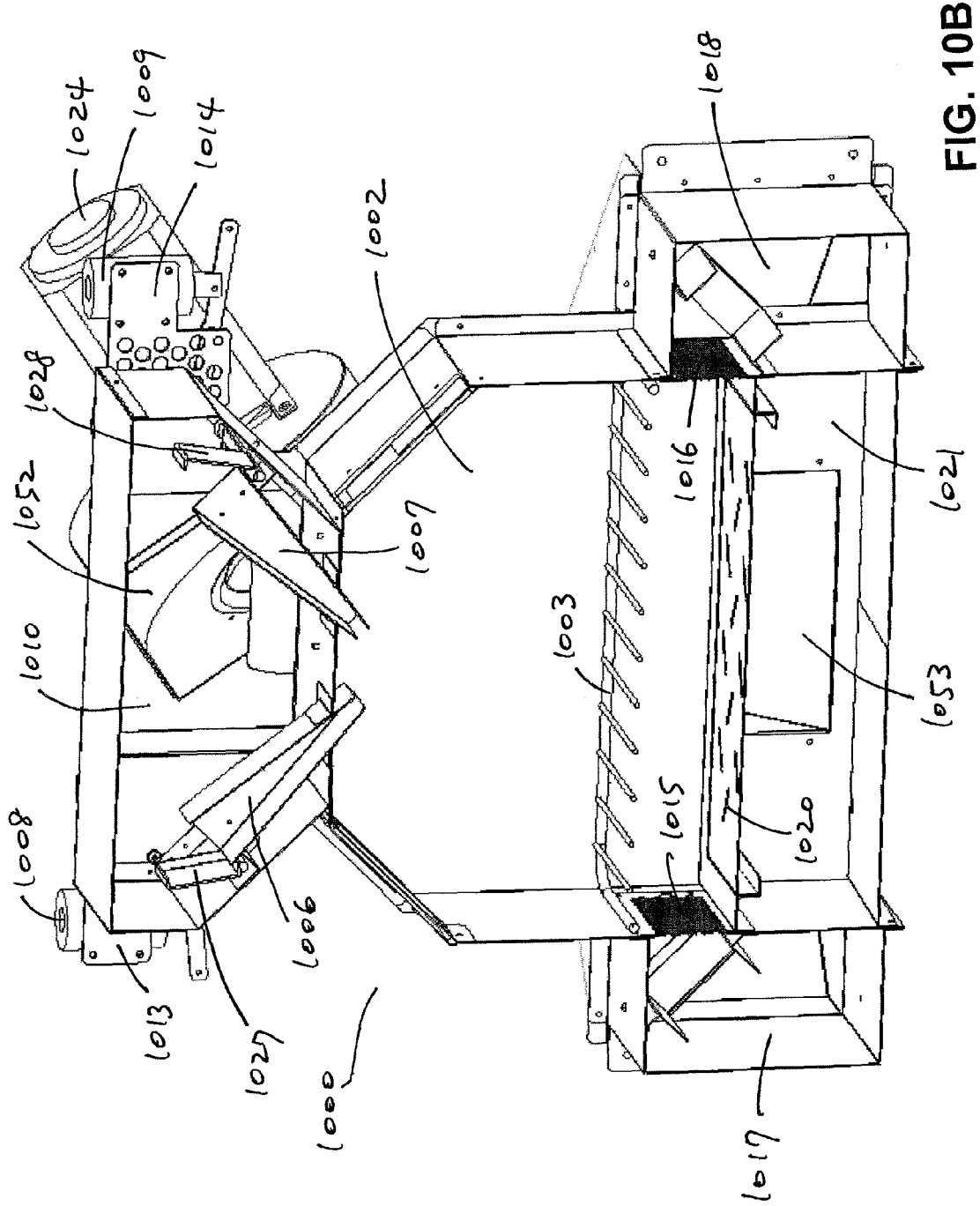
Figure 10C:
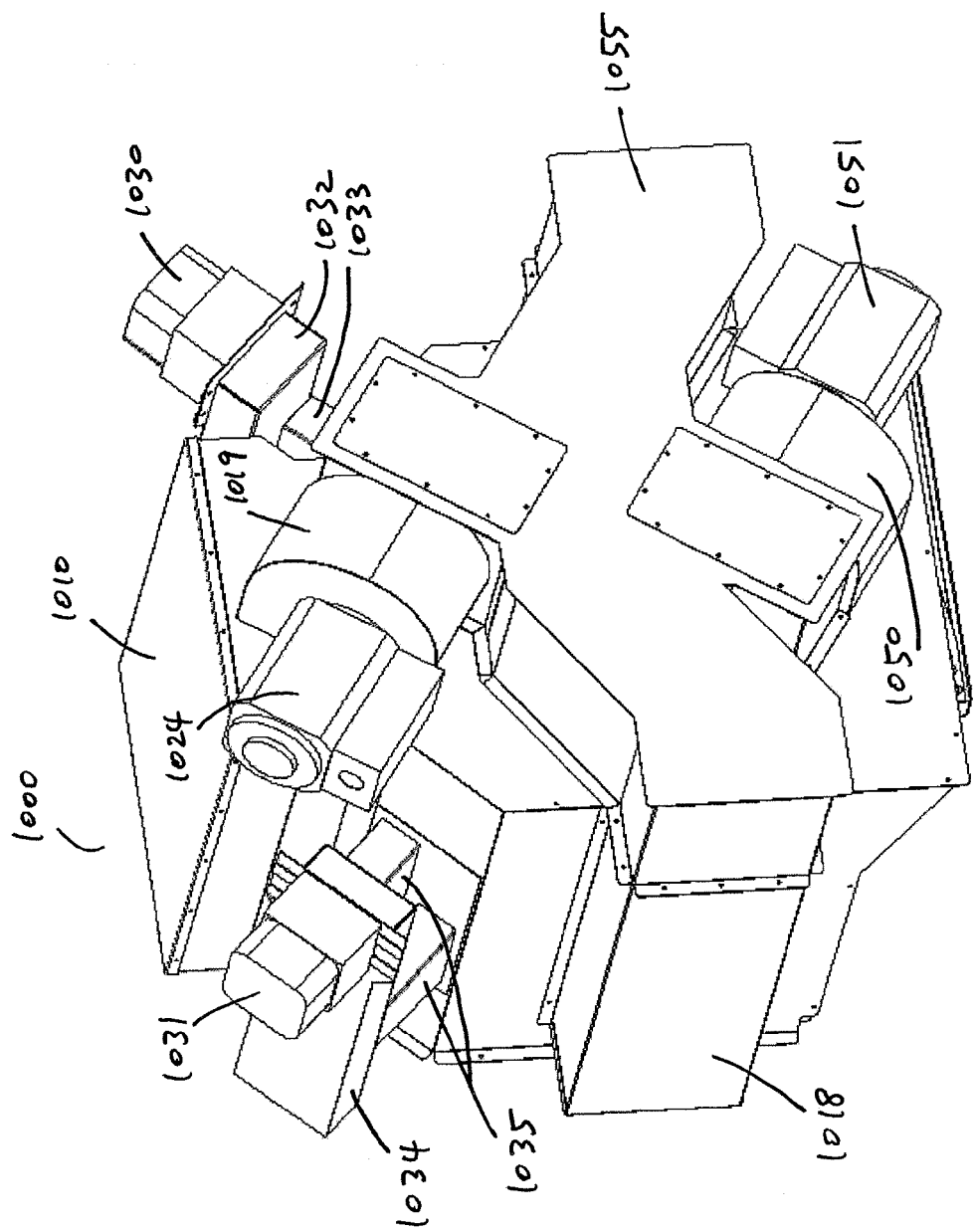

Referring now to FIGS. 10A, 10B, and 10C, therein illustrated is an exemplary large version of a hybrid cooking oven 1000. FIG. 10A is a frontal perspective view of the hybrid oven 1000 with its door 1001 open; FIG. 10B is a partial frontal cross-sectional view of the oven 1000 of FIG. 10A, with the view of magnetrons 1030, 1031 and their associated microwave resonators 1032, 1033, 1034, 1035 taken out for illustrative purpose; and FIG. 10C is a perspective view of the oven 1000 from the right rear. The oven 1000 comprises a cooking chamber 1002, which is adapted to receive a food product on a support 1003 for cooking. This exemplary large version may accommodate the support 1003 in the form of an elevator or an additional elevating mechanism for the support 1003 so that the height of the support 1003 may be dynamically adjusted during the operation of the oven 1000. The exemplary external dimension of the hybrid cooking oven 1000 is 30 inches wide, 26 inches deep, and 23 inches tall, and the exemplary dimension of the cooking chamber 1002 is 16.8 inches wide, 16.8 inches deep, and 12.6 inches tall.

As means for providing hot air impingement from the top of the cooking chamber, the oven 1000 has two tubes 1006 and 1007 for generating plume arrays of heated gas and introducing them into the cooking chamber 1002. These tubes 1006 and 1007 may be positioned on the top of the cooking chamber as shown in FIG. 10B. Each of the tubes 1006 and 1007 comprises a tube inlet coupled to an air inlet housing 1010 and a tube outlet coupled to the cooking chamber 1002. The tubes 1006 and 1007 may be of the type and configuration shown in FIGS. 6B, 6C, and 6D, and may further respectively comprise flaps 1027 and 1028 for respectively covering and opening the tube inlets of the tubes 1006 and 1007 to control the heated air flow through the tubes. Solenoids 1008 and 1009 may be used to respectively drive the flaps 1027 and 1028 to open and close the air inlets to the tubes 1006 and 1007. As noted above, brackets 1013 and 1014 may be used to respectively hold the solenoids 1008 and 1009 so that the heat transfer from the oven plenum to the solenoids can be minimized.

In this exemplary embodiment, the tube inlets for the two tubes 1006 and 1007 are both encased in a single air inlet housing 1010. The tubes 1006 and 1007 are configured to respectively direct their plume arrays toward substantially opposite portions of the support 1003 at a non-zero angle less than 90 degrees with respect to the surface of the support. In this configuration, the directions of the plume arrays from the tubes 1006 and 1007 cross each other above the food product placed on the support 1003.

The oven 1000 further comprises return air openings 1015 and 1016 on both side walls of the cooking chamber 1002. The return air opening 1015 is preferably positioned substantially at or along the intersection of the direction of the plume array generated by the tube 1007 and the side wall of the cooking chamber 1002. Likewise, the return air opening 1016 is preferably positioned substantially at or along the intersection of the direction of the plume array generated by the tube 1006 and the side wall of the cooking chamber 1002. The return air openings 1015 and 1016 allow the gas from the plume arrays generated by the tubes 1007 and 1006 to return from the cooking chamber 1002 to an air conduit 1055 via return air plenums 1017 and 1018, respectively.

While not shown in the figures, a thermal energy source, such as parallel heating coils, may be coupled to or disposed in the air conduit 1055 to heat the air disposed therein.

The oven 1000 also has bottom air inlets 1020 which are positioned below the support 1003 substantially at the bottom of the cooking chamber 1002 to direct a hot air flow to the underside of the support 1003. The hot air flowing through the bottom air inlets 1020 is supplied by a bottom air inlet plenum 1021. As shown in FIG. 10C, the oven 1000 has two independently controllable hot air blowers 1019 and 1050. The top blower 1019, driven by a top blower motor 1024, serves to direct the heated gas in the air conduit 1055 to the air inlet housing 1010 through a top blower outlet 1052. Meanwhile, the bottom blower 1050, driven by a bottom blower motor 1051, serves to divert a portion of the heated gas disposed in the air conduit 1055 to the bottom air inlet plenum 1021 through a bottom blower outlet 1053. Each of the blower motors 1024, 1051 may be a single speed or variable speed.

The hybrid oven 1000 also has two magnetrons 1030 and 1031 for generating microwave energies for microwave cooking. Each of the magnetrons 1030 and 1031 is coupled to a microwave resonator for propagating the microwave energy into the cooking chamber 1002. The microwave resonator may be of the type shown in FIGS. 7A, 7B, and 7C, and may comprise an upper resonator 1032, 1034 coupled to the magnetron 1030, 1031, and a lower resonator in the form of two feedhorns 1033, 1035, with an opening to the cooking chamber 1002. Alternatively, the microwave resonator may be any other waveguide known in the art.

In this exemplary embodiment, the microwave resonator comprising the upper resonator 1032 and the lower resonator 1033 on the upper left corner of the top of the cooking chamber 1002 and the microwave resonator comprising the upper resonator 934 and the lower resonator 935 on the upper right corner of the top of the cooking chamber 1002 are configured to respectively direct the microwave energies to propagate generally towards substantially opposite portions of the support 1003 at a non-zero angle less than 90 degrees with respect to the surface of the support. In this configuration, the propagation directions of the microwave energies from the microwave resonators from the both sides cross each other at a distance from the support in the cooking chamber 1002.

One common feature shared by the various exemplary embodiments of the present invention illustrated in FIGS. 8-10 and described above is the two-tube arrangement for hot air impingement positioned at the top of a cooking chamber. The two tubes are configured to respectively direct plume arrays or planar plumes of heated air towards substantially opposite portions of the support for a food product, with the directions of the plume arrays from the two tubes crossing above the food product. This feature is further illustrated in FIGS. 11A-11C.

Figure 11A:
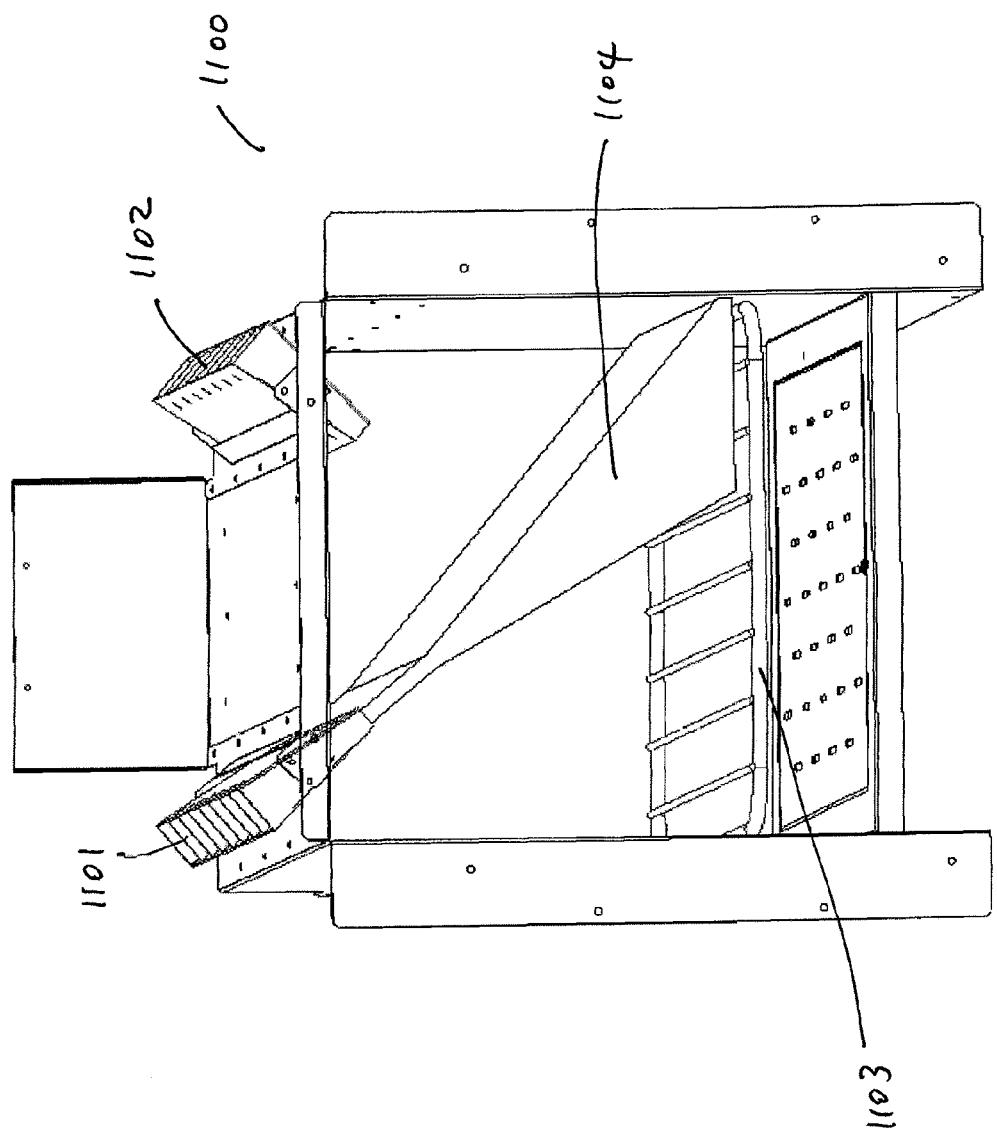
FIGS. 11A, 11B, and 11C respectively illustrate plume arrays generated by two tubes in at least one embodiment of the present invention.

In FIG. 11A, the left tube 1101 on the top of the cooking chamber generates a plume array 1104 of heated air and directs it toward the right portion of a support 1103 of a cooking oven 1100. Although the plume array 1104 spreads out as it travels through the cooking chamber, the tube 1101 is configured and designed in such a way that the impact of the plume array 1104 is focused substantially on the right portion of the support 1103. Likewise, in FIG. 11B, the right tube 1102 on the top of the cooking chamber generates a plume array 1105 of heated air and directs it toward the left portion of the support 1103. The tube 1102 is also configured and designed in such a way that the impact of the plume array 1105 is focused substantially on the left portion of the support 1103. When both of the tubes 1101 and 1102 are open and direct their respective plume arrays into the cooking chamber, their respective plume arrays collide above the support 1103, and the net result is that the impact of the sum of these plume arrays 1106 is focused substantially on the center of the support 1103, as shown in FIG. 11C.

The above-described capability of the tubes 1101 and 1102 to focus the impact of one or more plume arrays substantially on a selected portion of the support 1103 not only provides the new degree of flexibility, but also optimizes the utilization of the given amount of heated air in cooking a food product. For example, if the surface area of a food product placed on the center of the support 1103 is substantially smaller than the surface area of the support (e.g., a 6-inch sub placed on a 14.4 inch by 14.4 inch support), then one can maximize the contact between the heated air and the food product on the support by focusing the heated air in the form of plume arrays substantially on the center of the support, as shown in FIG. 11C. In this way, one can optimize the utilization of the heated air in cooking the food product, while minimizing the application of the heated air to the area of the support where the heated air is not needed (i.e., where the food product is not present).

In comparison, a typical conventional high-speed cooking oven uses columns of heated air, which are designed to strike a food product at an angle substantially perpendicular to the surface of the food product. By its design, the conventional high-speed oven applies the columns of heated air over the entire surface of the support, without the capability of focusing the heated air on a selected portion of the support. Hence, compared to the present invention, the conventional high-speed oven is not only much less flexible, but also much less efficient in utilizing the given amount of heated air in cooking a food product, as much of the impinging air does not contact the food product.

Figure 11B:
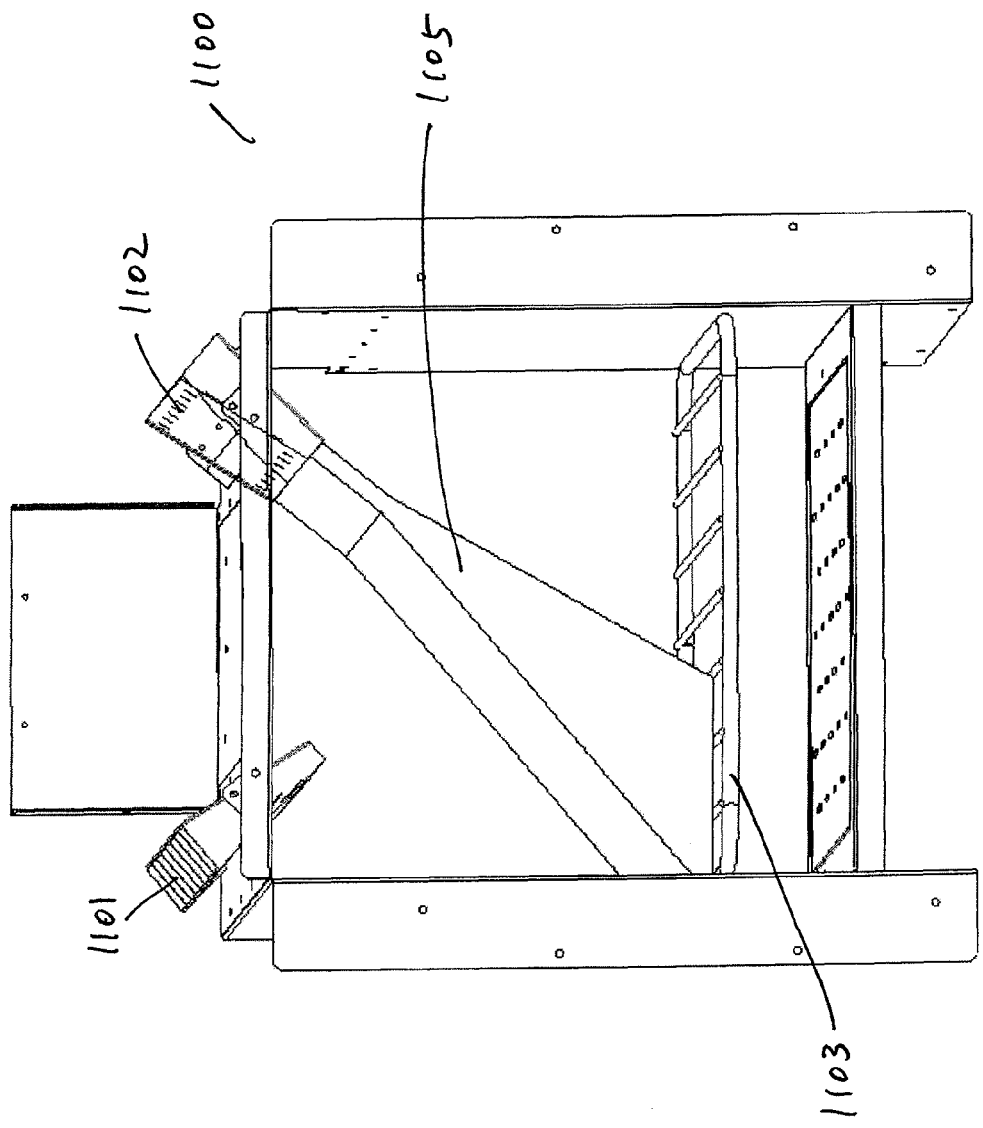
Figure 11C:
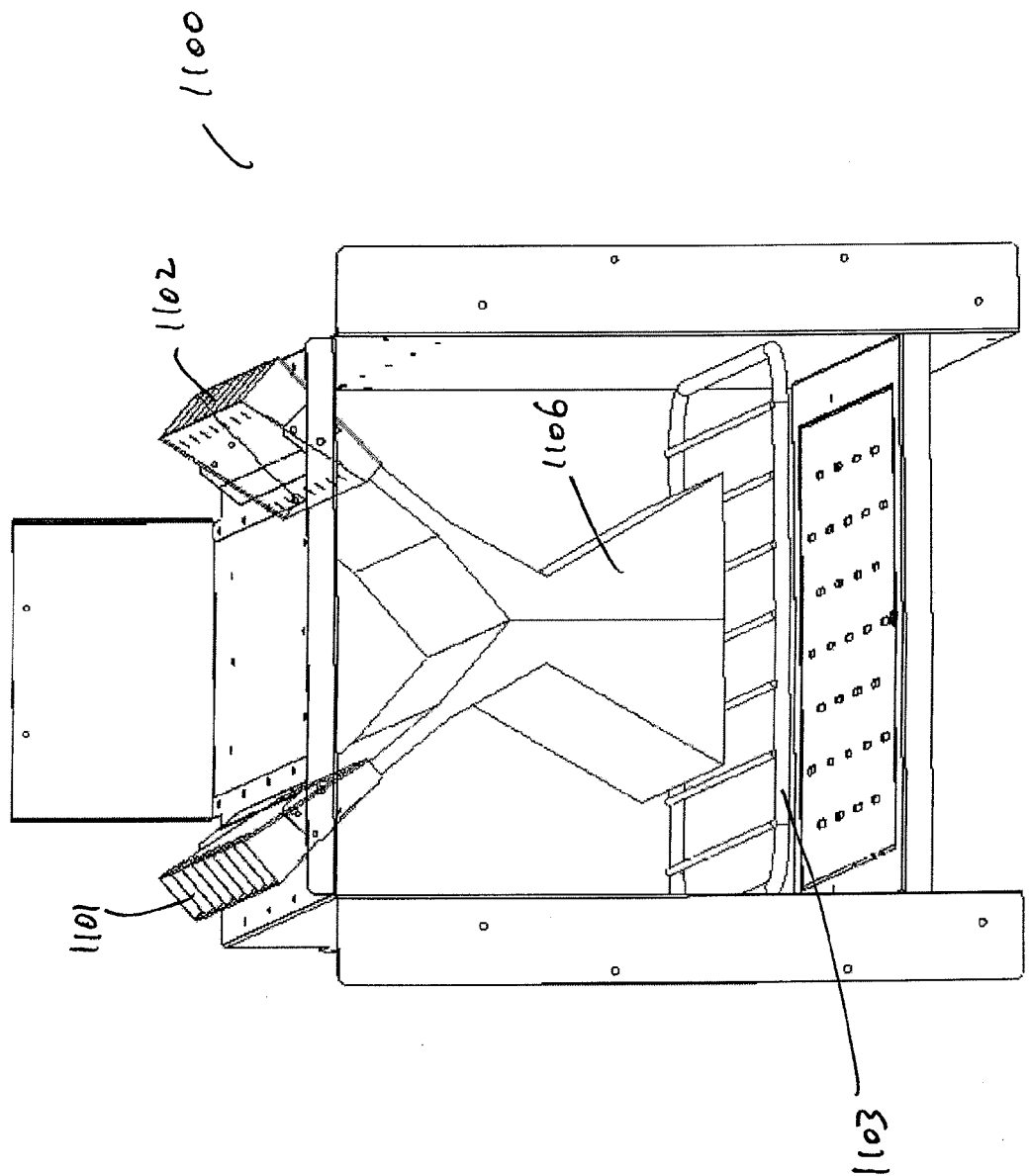

Even for a food product with a relatively large surface area, the two-tube arrangement shown in FIGS. 11A, 11B and 11C is much more efficient in utilizing the heated air than the conventional high-speed oven. Because the direction of the plume array of heated air from the tube 1101, 1102 is at a non-zero angle less than 90 degrees with respect to the surface of the support 1103, the heated air is drawn laterally across the surface of the food product after the impact and moves toward the side edges of the support 1103. This lateral drawing of the heated air across the food surface facilitates the heat transfer from the heated air to the food product. As discussed above, by positioning a return air opening at or along the intersection of the direction of the plume array from the tube 1101, 1102 and the side wall of the cooking chamber, one may further enhance the effect of drawing the heated air laterally across the food surface, thereby optimizing the cooking efficiency.

The above-described features and improvements in accordance with the present invention enable a high-speed cooking oven based on a combination of hot air impingement and microwave to deliver optimal cooking efficiency. Tangible benefits of this improvement in the cooking efficiency in the high-speed cooking technology are the reduction in the cooking time at a given electrical power supply, and alternatively, the reduction in the electrical power required to operate a high-speed cooking oven for a given cooking capacity (i.e., given cooking time). As noted in the Background section, because of their sub-optimal cooking efficiency, conventional high-speed cooking ovens must operate on an electrical power supply based on 220 volts or greater. By further improving and optimizing the cooking efficiency under the present invention, high-speed cooking ovens that operate on an electrical power supply based on 220 volts or greater can now draw a current less than 30 amperes, preferably approximately 13.5 amperes. Furthermore, the high-speed cooking technology based on a combination of air impingement and microwave may now be extended with more productive results to ovens operating on an electrical power supply based on a voltage less than 220 volts, preferably a power supply based on a voltage between 110 and 125 volts and a current of 30 amperes or less, which is more widely available than the 220 volt-based power supply. Hence, the present invention enables the high-speed cooking technology to find a wider range of applicability and customer base compared to the conventional high-speed cooking technology with the sub-optimal cooking efficiency.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. An oven, comprising:
a cooking chamber defined by a top, a bottom, a rear wall, and a pair of side walls;
one or more blowers that provide a gas to the cooking chamber; and
a plurality of plenums substantially surrounding the cooking chamber such that the gas exits the cooking chamber through at least two opposing walls of the cooking chamber so that the gas flows adjacent the side walls to adjacent the rear wall as the gas flows outside the cooking chamber through the plurality of plenums returning the gas from the cooking chamber to the one or more blowers.

2. The oven of claim 1, wherein the plurality of plenums includes at least one plenum through which gas is provided to the cooking chamber.

3. The oven of claim 2, wherein the at least one plenum is disposed atop the cooking chamber.

4. The oven of claim 2, wherein the at least one plenum is disposed beneath the cooking chamber.

5. The oven of claim 2, wherein the at least one plenum is disposed behind the cooking chamber.

6. The oven of claim 1, wherein the plurality of plenums includes at least one plenum through which gas from the cooking chamber returns to the one or more blowers.

7. The oven of claim 6, wherein the at least one plenum is disposed adjacent one of the side walls of the cooking chamber.

8. The oven of claim 6, wherein the at least one plenum is disposed behind the cooking chamber.

9. The oven of claim 1, wherein: the side walls are located across the cooking chamber from one another; a first plenum is disposed adjacent one of the pair of side walls; and a second plenum is disposed adjacent the other one of the pair of side walls.

10. The oven of claim 1, wherein said plurality of plenums substantially surround the cooking chamber such that the gas contacts at least a portion of the top wall as it flows outside the cooking chamber from the one or more blowers through the plenums before returning to the one or more blowers.

11. The oven of claim 1, further comprising at least one sloped wall disposed between an edge of one of the pair of side walls and an edge of the top wall.

12. The oven of claim 11, wherein said plurality of plenums substantially surround the cooking chamber such that the gas contacts at least a portion of the sloped wall as it flows outside the cooking chamber from the one or more blowers through the plenums before returning to the one or more blowers.

13. An oven, comprising:
a cooking chamber defined by a top, a bottom, a rear wall, and a pair of side walls;
one or more blowers that provide a gas to the cooking chamber; and
a plurality of plenums substantially surrounding the cooking chamber such that the gas exits the cooking chamber through at least two opposing walls and flows adjacent the side walls to adjacent the rear wall as the gas flows outside the cooking chamber through the plurality of plenums returning the gas from the cooking chamber to the one or more blowers,
wherein: the side walls are located across the cooking chamber from one another; a first plenum is disposed adjacent one of the pair of side walls; and a second plenum is disposed adjacent the other one of the pair of side walls, and
wherein said at least two opposing walls are the pair of side walls, and wherein each one of the side walls of the pair of side walls includes a return air opening located through which gas flows from the cooking chamber to the first plenum or the second plenum.

14. The oven of claim 13, wherein the return air opening is located near the bottom of the cooking chamber.

15. An oven, comprising:
a cooking chamber including a first side wall and a second side wall located across the cooking chamber from the first side wall;
a rear plenum disposed behind the cooking chamber;
at least one top plenum disposed atop the cooking chamber and in gaseous communication with the cooking chamber;
a bottom plenum disposed beneath the cooking chamber and in gaseous communication with the cooking chamber;
a first side plenum disposed adjacent the first side wall and in gaseous communication with the cooking chamber and the rear plenum; and
a second side plenum disposed adjacent the second side wall and in gaseous communication with the cooking chamber and the rear plenum, wherein the cooking chamber has a gas that exits the cooking chamber through at least two opposing walls of the cooking chamber.

16. The oven of claim 15, wherein the top plenum comprises a plenum for supplying a gas to the cooking chamber.

17. The oven of claim 15, wherein the bottom plenum comprises a plenum for supplying a gas to the cooking chamber.

18. The oven of claim 15, further comprising one or more blowers, wherein the gas flowing through the rear plenum is returned to the one or more blowers.

* * * * *